United States Patent [19]
Akiyama et al.

[11] Patent Number: 6,067,134
[45] Date of Patent: May 23, 2000

[54] STACKED CELL LIQUID CRYSTAL DISPLAY DEVICE WITH CONNECTORS PIERCING THOUGH UPPER CELLS

[75] Inventors: Masahiko Akiyama, Tokyo; Yutaka Nakai, Yokohama, both of Japan

[73] Assignee: Kabushiki Kaisha Toshiba, Kawasaki, Japan

[21] Appl. No.: 09/040,443

[22] Filed: Mar. 18, 1998

[30] Foreign Application Priority Data

Mar. 19, 1997 [JP] Japan ...................................... 9-065643

[51] Int. Cl.⁷ ........................ G02F 1/1347; G02F 1/1343
[52] U.S. Cl. ............................................... 349/74; 349/139
[58] Field of Search .................................. 379/74, 75, 70, 379/77, 78, 81, 82, 156, 139

[56] References Cited

U.S. PATENT DOCUMENTS

| | | | |
|---|---|---|---|
| 3,863,332 | 2/1975 | Leupp et al. | 349/156 |
| 4,653,864 | 3/1987 | Baron et al. | 349/156 |
| 5,463,481 | 10/1995 | Yamamura | 349/74 |
| 5,625,474 | 4/1997 | Aomori et al. | 349/79 |
| 5,712,695 | 1/1998 | Tanaka et al. | 349/79 |
| 5,790,215 | 8/1998 | Sugahara et al. | 349/74 |
| 5,861,929 | 1/1999 | Spitzer . | |

FOREIGN PATENT DOCUMENTS 6-337643  12/1994  Japan .
8-313939  11/1996  Japan .

Primary Examiner—Kenneth Parker
Attorney, Agent, or Firm—Finnegan, Henderson, Farabow, Garrett & Dunner, L.L.P.

[57] ABSTRACT

Some conventional liquid crystal display devices were hard to make connection to a pixel electrode interposed between liquid crystal layers when a picture element is configured by laminating a plurality of liquid crystal layers. The liquid crystal display device comprises a first substrate having a first applying means for applying a first signal; a first electrode opposed to the first substrate; at least one liquid crystal layer interposed between the first substrate and the first electrode; a pillar made of an insulating material, formed on the first substrate so as to have a lateral face and to pierce through the liquid crystal layers; and at least one first wiring pattern formed on the lateral face of the pillar to connect the first applying means and the first electrode. Specifically, this liquid crystal display device has the pillar and the wiring pattern formed on the lateral face of the pillar as the inter-connector to connect to the pixel electrode interposed between the liquid crystal layers. The pillar may be formed into, for example, a truncated pyramid shape, and its top face can be used to connect the pixel electrode with the wiring pattern.

25 Claims, 20 Drawing Sheets

⊙ ELONGATION AXIS
↔ ELONGATED DIRECTION

STACKED CELL LIQUID CRYSTAL DISPLAY DEVICE WITH CONNECTORS PIERCING THOUGH UPPER CELLS

BACKGROUND OF THE INVENTION

1. Field of the Invention

The invention relates to a liquid crystal display device, and more particularly to a liquid crystal display device which has its display screen formed of a plurality of laminated liquid crystal layers.

Also, the invention relates to an inter-connector for inter-connecting a plurality of opposed conductive layers with interposing an insulating layer.

The invention relates to a liquid crystal display device having a liquid crystal layer with high reflectance or absorption of light.

2. Description of the Related Art

The liquid crystal display device, which is thin and consumes merely a low power, is now used for the display screens of OA equipment such as PCs (personal computers), word processors and EWS; displays of electronic calculators, Electronic Book (trademark), electronic organizers and PDAs; and TV monitors and in many other fields. The liquid crystal display device is particularly characterized by its low power consumption as compared with other displays such as CRTs and plasma displays. And its application is expected to be expanded further to notebook PCs, PDAs, portable TVs, portable telephones, portable FAXs and other portable information-processing equipment. Such portable information-processing equipment must be battery-driven, and its display device must use lower power. The display device for the portable equipment is desired to have low power consumption of 500 mW or below, more preferably several mW.

Among other liquid crystal display devices, one having a display screen on which images are directly seen is called a direct-vision type. The direct-vision type liquid crystal display device includes a transmission type which has a light source such as a fluorescent lamp on the back of a liquid crystal cell and a reflection type which uses surrounding light to display. The former needs the backlight and, therefore, it is not suitable to be a low power consumption type. The backlight has power consumption of 1 W or more, and if batteries are used, its usable time is limited to about two to about three hours. Therefore, the reflection type liquid crystal display device is often used for the display screen of the portable electronic equipment such as portable information-processing equipment.

Conventionally, a TN-type liquid crystal was used for a reflection type simple matrix liquid crystal display device. But, the liquid crystal display device having the TN-type liquid crystal needs a polarizing plate, and its reflectance is limited to about 30%. Therefore, there is a disadvantage that the display screen is dark. Additionally, the simple matrix liquid crystal display device has a disadvantage that a contrast lowers when the number of pixels is increased and the display quality is also lowered.

Accordingly, for the reflection type liquid crystal display device, a GH (guest host) display mode not requiring a polarizing plate is most promising in view of the light utilization efficiency. It is now being tried to employ the GH mode to make the active matrix drive in order to achieve a liquid crystal display device having a high reflectance and a high contrast.

To achieve a color display on the reflection type liquid crystal display device, there is an ECB mode (electrically controlled birefringence) to control a reflected wavelength by an applied voltage, but it has a disadvantage that a displayable color range is narrow. In addition, there is also a known method that a picture element is configured by disposing RGB pixels configured by using, for example, a color filter on a plane surface.

Generally, it is most preferable to configure using the GH liquid crystal cells laminated to achieve the color display having a wide color reproduction range by the reflection type liquid crystal display device. On the other hand, an array arrangement of the RGB pixels in a same plane or an array arrangement of C(cyan), M(magenta) and Y(yellow) pixels in a same plane cannot display the same color by all pixels. Therefore, a reflectance is low, display is dark, and a color reproduction range is narrowly restricted.

FIG. 17 is a schematic diagram showing the structure of a conventional liquid crystal display device having parallel-arranged RGB pixels.

In the figure, 980 is an array substrate, and a switching TFT 987 for supplying a potential to a reflection pixel electrode 982 is formed thereon. In addition, 985 is a counter substrate, and a counter electrode 984 is formed to cover a color filter 986 formed on the surface of the counter substrate 985. Additionally, a guest host liquid crystal 983 is interposed between the array substrate 980 and the counter substrate 985. By configuring as described above, full-color display can be made in principle. But, since pixels of the three primary colors are arranged in parallel to configure the picture element, each of the three primary colors is limited to reflect on an area about ⅓ of the picture element. Thus, there are disadvantages that a light using efficiency is poor, and the screen becomes dark.

For example, a known liquid crystal display device for color display by the GH method has three-layered GH mode liquid crystal cells respectively containing pigments of the three primary colors cyan, magenta and yellow. With this liquid crystal display device having the three layered structure of the subtractive primary colors cyan, magenta and yellow, the light using efficiency can be improved.

But, the liquid crystal display device of a type configuring the picture element by laminating a plurality of pixels as described above is hard to apply a display signal voltage to each of the plurality of laminated liquid crystal layers, and the cost becomes high. Especially, when the display signal is applied from the substrate side to the pixel electrode interposed between the laminated liquid crystal layers, the liquid crystal display device has a complex structure, its productivity is lowered, and the cost becomes high.

To configure the liquid crystal display device having the GH mode, there is another subject to be achieved that the light reflection efficiency or absorbing efficiency of the GH liquid crystal layer is improved. If the incident light can not be reflected or absorbed fully by the liquid crystal layer, the quality of display is degraded.

SUMMARY OF THE INVENTION

The invention aims to remedy the disadvantages described above.

It is an object of the invention to provide an inter-connector having high reliability and high productivity. Especially, it is an object of the invention to provide an inter-connector for connecting a plurality of layers at high productivity and reliability.

It is also an object of the invention to provide a liquid crystal display device having a structure with high productivity. Especially, it is an object of the invention to provide a high-definition liquid crystal display device, which is configured to have high productivity with a low power consumption.

The invention also aims to provide a liquid crystal display device having liquid crystal layers with high reflectance or absorption of the incident light. Especially, the invention aims to provide a reflection type liquid crystal display device having a high contrast and bright display.

A first aspect of the liquid crystal display device of the invention is to comprises a first substrate having a first applying means for applying a first signal; a plurality of liquid crystal layers stacked on the first substrate; at least one first electrode interposed between the liquid crystal layers; and an interconnecting means for interconnecting the first applying means and the first electrode, which comprises a pillar made of an insulating material, formed on the first substrate so as have a lateral face and to pierce through at least one layer of the liquid crystal layers, and at least one first wiring pattern formed on the lateral face of the pillar to connect the first applying means and the first electrode.

A second aspect of the liquid crystal display device of the invention is to comprise a first substrate having a first applying means for applying a first signal; a first electrode opposed to the first substrate; at least one liquid crystal layer interposed between the first substrate and the first electrode; a pillar made of an insulating material and formed on the first substrate so as to have a lateral face and to pierce through the liquid crystal layers; and at least one first wiring pattern formed on the lateral face of the pillar to connect the first applying means and the first electrode.

In the liquid crystal display device of the invention, the pillar has a truncated pyramid shape, and its top face may be opposed to at least a part of the first electrode. The pillar may be formed for each picture element or formed like a continuous bank along a plurality of continuous picture elements. Besides, the pillar may be formed into a square pattern to surround respective picture elements.

In the liquid crystal display device of the invention, the first wiring pattern is formed extended to a top face of the pillar, and the first wiring pattern may be connected with the first electrode on the top face of the pillar.

In the liquid crystal display device of the invention, the first wiring pattern and the first electrode are laminated on the top face of the pillar with an insulating film having a through hole interposed therebetween, and the first wiring pattern and the first electrode layer may be connected through the through hole.

In the liquid crystal display device of the invention, the liquid crystal layer may comprise a plurality of microcapsules containing at least one liquid crystal material.

In the liquid crystal display device of the invention, the liquid crystal layer may comprise a polymer matrix and at least a liquid crystal material dispersed in the polymer matrix.

In the liquid crystal display device of the invention, the liquid crystal layer comprises a first liquid crystal layer and a second liquid crystal layer, and the first substrate having a second applying means for applying a second signal may comprise a second electrode interposed between the first liquid crystal layer and the second liquid crystal layer and overlapped with the first electrode; and at least one second wiring pattern formed on the lateral face of the pillar to connect the second applying means and the second electrode.

In the liquid crystal display device of the invention, the second wiring pattern has a first portion which is formed from the second applying means to the top face of the pillar and a second portion which is formed from the top face of the pillar to the second electrode, and the first portion and the second portion of the second wiring pattern may be connected on the top face of the pillar. The second portion of the wiring pattern and the pixel electrode may be formed into an integrally continuous pattern. In this continuous pattern, the portion formed in the lateral face of the pillar is called the second portion, and the portion interposed between the liquid crystal layers is called the pixel electrode. In addition, the neighborhood of the boundary between the pixel electrode and the second portion of the wiring pattern is called the connecting portion.

In the liquid crystal display device of the invention, the second portion may be laminated on the first portion.

In the liquid crystal display device of the invention, the connecting portion between the pixel electrode and the wiring pattern is preferably formed to relieve a stress applied thereto. For example, a connecting portion between the first wiring pattern and the first electrode and a connecting portion between the second electrode and the second wiring pattern are preferably formed to relieve a stress.

In the liquid crystal display device of the invention, the connecting portion between the second wiring pattern and the second electrode may be formed into a curved shape.

In the liquid crystal display device of the invention, the first substrate having a third applying means for applying a third signal may further comprise a third electrode which is formed on the first substrate with an insulating layer interposed therebetween so as to overlap with the first electrode and the second electrode, and connected with the third applying means through the insulating layer.

The liquid crystal display device of the invention may further comprise a second substrate having a fourth electrode, a third liquid crystal layer interposed between the first electrode and the fourth electrode, and a fourth applying means for applying a fourth signal to the fourth electrode.

In the liquid crystal display device of the invention, the reflection or absorption of light by the respective (first to third) liquid crystal layers may be different.

In the liquid crystal display device of the invention, the liquid crystal display device has a plurality of the first electrodes, the second electrodes and the third electrodes, and the pillar may be formed so as to be elongated along the plurality of the first electrodes. For example, the pixel electrodes may be formed into a matrix, and the pillar may also be formed into the form of a bank along these pixel electrodes. In addition, it may also be formed into a square pattern to surround the respective pixel electrodes.

In addition, a liquid crystal display device in the present invention can be comprises a first substrate having a first applying means for applying a first signal; at least a first electrode opposed to the first substrate; at least a liquid crystal layer interposed between the first substrate and the electrode; at least wall having a top face and a lateral face, the wall formed on the first substrate so as to pierce through the liquid crystal layers, and the wall is formed of an insulating material; and, at least a first wiring pattern formed on a lateral face of the wall, and the first wiring pattern connects the applying means and the first electrode.

In this Liquid crystal display device, the plurality of first electrodes can be arranged in a matrix array, and the wall is elongated with a column or a row of the first electrodes. Moreover, in the liquid crystal display device, the plurality of first electrodes arranged in a matrix array, and the wall surrounds respective first electrodes.

A third aspect of a liquid crystal display device of the invention is to comprises a first substrate having a first applying means for applying a first signal and a second applying means for applying a second signal; a first electrode opposed to the first substrate; a first liquid crystal layer and a second liquid crystal layer interposed between the first substrate and the electrode, and the first liquid crystal layer is laid upon the second liquid crystal layer; a second electrode interposed between the first liquid crystal layer and the second liquid crystal layer; a first pillar formed on the first substrate so as to pierce through the first and the second liquid crystal layers, the first pillar is formed of an insulating material, and the first pillar having a lateral face; a second pillar formed on the first substrate so as to pierce through the second liquid crystal layer, the second pillar is formed of an insulating material, and the second pillar having a lateral face; at least a first wiring pattern formed on a lateral face of the first pillar, and the first wiring pattern connects the first applying means and the first electrode; and, at least a second wiring pattern formed on a lateral face of the second pillar, and the second wiring pattern connects the second applying means and the second electrode.

Those liquid crystal display device in the invention employs a pillar or a wall and the wiring patterns formed thereon to establish interconnections between the substrate and respective electrodes. However, the liquid crystal display device in the invention can employ a plurality of pillars or walls and the wiring patterns formed thereon to establish interconnections between the substrate and respective electrodes. In those cases, a plurality of pillars or walls can have different shapes. For example, it is possible to place a first pillar and a second pillar having different heights in the respective picture elements.

A fourth aspect of the liquid crystal display device of the invention relates to a liquid crystal display device having a liquid crystal layer, wherein the liquid crystal layer comprises a first liquid crystal layer consisting of a plurality of first microcapsules containing at least first liquid crystal molecules, and a second liquid crystal layer consisting of a plurality of second microcapsules containing at least second liquid crystal molecules, and the first liquid crystal layer and the second liquid crystal layer have different light axis of reflection or light axis of absorption or a different polarization direction of circularly polarized light.

In the liquid crystal display device of the invention, the first liquid crystal molecules and the second liquid molecules can be identical.

Also, in the liquid crystal display device of the invention, the first liquid crystal molecules are oriented in a first direction in the first microcapsules, and the second liquid crystal molecules are oriented in a second direction, which is different from the first direction, in the second microcapsules.

In the liquid crystal display device of the invention, the first direction is substantially perpendicular to the second direction, and the first direction and the second direction are substantially perpendicular to a normal direction of the liquid crystal layer.

In the liquid crystal display device of the invention, the first microcapsules may have means for orienting the first liquid crystal molecules in the first direction, and the second microcapsules may have means for orienting the second liquid crystal molecules in the second direction.

In addition, a liquid crystal such as a cholesteric liquid crystal for selectively reflecting or absorbing either of a pair of circularly polarized lights may be sealed into the microcapsules.

The liquid crystal display device of the invention comprises a substrate having a nonlinear element, a plurality of liquid crystal layers laminated on the substrate, electrodes capable of applying a voltage with the respective liquid crystal layers interposed therebetween, and an inter-connector for connecting the electrode and the nonlinear element, wherein the inter-connector has a structure made of an insulating material formed on the substrate to pierce through one layer of at least the liquid crystal layers and a wiring pattern formed on the surface of the structure.

In the liquid crystal display device of the invention, the structure has a flat top face and the inter-connector may be connected with the electrode on the top face through the contact hole.

In the liquid crystal display device of the invention, the liquid crystal layers may be formed of a capsuled liquid crystal having partitions.

In the liquid crystal display device of the invention, the plurality of liquid crystal layers laminated may be formed of a plurality of liquid crystal layers having a different wavelength of absorbing or reflecting light.

In the liquid crystal display device of the invention, the structure may be formed in the form of a column or bank shape, and at least a part of the wiring pattern may be formed on its lateral face or top face.

In the liquid crystal display device of the invention, a relieving member may be formed between the structure and the wiring pattern in order to relieve a stress applied between the structure and the wiring pattern or between the liquid crystal layer and the structure. Such a stress may be produced due to a difference in thermal expansion coefficient among the structure, the wiring pattern and the liquid crystal layer. Therefore, the stress-relieving member secures a reliable interconnection even if a stress is applied. Additionally, reliability of the liquid crystal display device can be improved.

The inter-connector of the invention for connecting a first conductive layer and a second conductive layer with an insulating member interposed therebetween comprises a pillar formed of an insulating material to have a lateral face and piercing through the insulating layer, and at least one first wiring pattern formed on the lateral face of the pillar to connect the first conductive layer and the second conductive layer.

In the inter-connector of the invention, the pillar has a truncated pyramid shape, and its top face may be opposed to the first conductive layer.

In the inter-connector of the invention, the first wring pattern is formed extended to the top face of the pillar, and the first wiring pattern may be connected with the first conductive layer on the top face of the pillar.

In the inter-connector of the invention, the first wiring pattern and the first conductive layer are laminated on the top face of the pillar with an insulating film having a through hole interposed therebetween, and the first wiring pattern and the first conductive layer may be connected through the through hole.

In the inter-connector of the invention, the insulating layer comprises a first insulating layer and a second insulating layer, and further comprises a third conductive layer interposed between the first insulating layer and the second insulating layer; and at least one second wiring pattern formed on the lateral face of the pillar to connect the first conductive layer and the third conductive layer.

In the inter-connector of the invention, a connecting portion of the first conductive layer and the third conductive layer is preferably formed to relieve a stress.

In the inter-connector of the invention, the connecting portion of the second wiring pattern may have a curved profile.

In the inter-connector of the invention, the insulating layer may be a liquid crystal layer.

In the inter-connector of the invention, the liquid crystal layer may comprise a plurality of microcapsules containing at least a liquid crystal.

In the liquid crystal display device of the invention, the first electrode, the second electrode and the third electrode are, for example, a pixel electrode, and the fourth electrode is, for example, a common electrode. To display, a display signal is applied to these pixel and counter electrodes, an electric field is formed by a voltage corresponding to the display signal to make the liquid crystal layer respond, and its orientation state and phase change state are controlled to modulate the incident light into the liquid crystal layer. To apply the invention to a reflection type liquid crystal display device, the third electrode as the bottom layer preferably has a function of the reflector for reflecting the incident light or the absorbing plate for absorbing the incident light. In addition, the first electrode, the second electrode and the fourth electrode may be made of a transparent conductive material such as ITO (indium tin oxide) . The third pixel electrode may also be made of a transparent conductive material with a reflector and a light-absorbing plate disposed below it.

The first substrate is, for example, an array substrate having the pixel electrode, and the second substrate is, for example, a counter electrode having the counter electrode. The first substrate may be a counter substrate, and the second substrate being an array substrate. In this case, the third electrode is a common electrode, and the fourth electrode be a pixel electrode. Description below will be made with the first substrate as the array substrate and the second substrate as the counter substrate.

The first substrate and the second substrate can be a transparent insulating substrate made of, for example, glass, non-alkali glass, quartz, acrylic resin or the like. To apply the invention to a reflection type liquid crystal display device, one of the substrates is not required to be transparent. For example, the substrate below the base (a larger area) of the truncated pyramid shaped pillar may be opaque.

The liquid crystal display device of the invention can supply a display signal voltage from the applying means formed on the first substrate to the pixel electrode interposed between the plurality of liquid crystal layers by the above-described inter-connector of the invention. The invention can also be applied to a liquid crystal layer which is made of a single layer. In this case, a driver and a pixel selecting circuit can be formed on one of the substrates faced with the liquid crystal layer to supply a display signal or the like to both liquid crystal layers by the inter-connector.

The first applying means, the second applying means and the third applying means may be a signal line driver for supplying the display signal to the signal line and a selecting means for selectively applying to the pixel electrode a display signal to be applied to the signal line. This configuration can supply the display signal to the pixel electrode of each layer at independent timing even if the liquid crystal display device has a picture element formed of a plurality of laminated pixel electrodes. In addition, the signal applied to the pixel electrodes is an analog voltage but may be sent as a digital data to respective picture elements, and the digital display data is sampled, D/A modulated and supplied to the pixel electrodes as the analogue voltage.

The selecting means may be a nonlinear switching element such as a thin film transistor (TFT) or a metal insulator metal (MIM) and a drive means for the switching element. In addition, the selecting means may be provided in multiple numbers in accordance with the number of pixel electrodes. For example, three selecting means may be disposed to three liquid crystal layers laminated.

The signal line and the signal line driver may be provided in a plurality of systems according to the number of laminated liquid crystal layers. Additionally, an address line (scanning line) and an address line driver (scanning line driver) may have a plurality of systems in correspondence with the signal line drivers. In addition, the address lines may be commonly used by the switching elements of a plurality of systems.

For example, the source and drain of a first TFT are interposed between a first pixel electrode and a first signal line to apply the scanning signal from the address line (scanning line) driver to the gate electrode of the first TFT through the address line. Thus, when the first TFT is turned on by the scanning signal, the first display signal being supplied to the first signal line can be supplied selectively to the pixel electrodes. Similarly, source and drain of the second TFT are interposed between the second pixel electrode and the second signal line to apply the scanning signal from the address line (scanning line) driver to the gate electrode of the second TFT through the address line. Thus, the second display signal being supplied to the second signal line can be supplied selectively to the pixel electrodes when the second TFT is on. By configuring in the same way, the third display signal can be supplied to the third electrode. In the liquid crystal display device of the invention, even when the first electrode and the second electrode are not formed on the substrate but interposed between the liquid crystal layers, the display signal can be applied from the first substrate to the respective electrodes through the inter-connector. In addition, since this inter-connector has a simple structure, its height can be adjusted to form the laminated liquid crystal layers regardless of their number, so that the productivity of the liquid crystal display device can be improved substantially.

By configuring as described above, the liquid crystal display device of the invention can independently supply the display signal to each pixel electrode of the respective layers of the laminated liquid crystal layers.

In the liquid crystal display device of the invention, the picture element is formed of the plurality of laminated liquid crystal layers and the first to fourth electrodes for applying the display signals to these liquid crystal layers. This configuration can improve a light using efficiency to about three times as compared with a configuration that the picture element is formed by positioning pixels in parallel to one another. Therefore, the display brightness and contrast can be improved.

When the liquid crystal display device of the invention forms its display screen by laminating, for example, three liquid crystal layers, pixels C (cyan), M (magenta) and Y (yellow) of respective liquid crystal cells may be laminated to configure a picture element by the pixels of subtractive three primary colors. For example, when GH layers of the subtractive three primary colors such as C (cyan), M (magenta) and Y (yellow) are laminated, the picture element is formed of the three laminated C, M, Y pixels. In addition, the display signal is dependently applied to the respective pixels configuring the picture element by the thin film transistors or the like.

By configuring the liquid crystal display device of the invention using a selective reflection mode liquid crystal layer, RGB lights are reflected on the respective liquid crystal layers and absorbed by the bottom pixel electrode (e.g., the third pixel electrode) or the first substrate to make the same color display as described above.

In the above description, a base member of the interconnecting means in the invention is not only limited to a pillar or a pillar like projection but also can be a wall or a wall-like insulating projection(s). Moreover, the wall or the wall-like insulating objects can be arranged in a parallel crosses or a projecting parallels.

DESCRIPTION OF THE PREFERRED EMBODIMENTS

Embodiments of the invention will be described with reference to the accompanying drawings.

(Embodiment 1)

Figure 1:
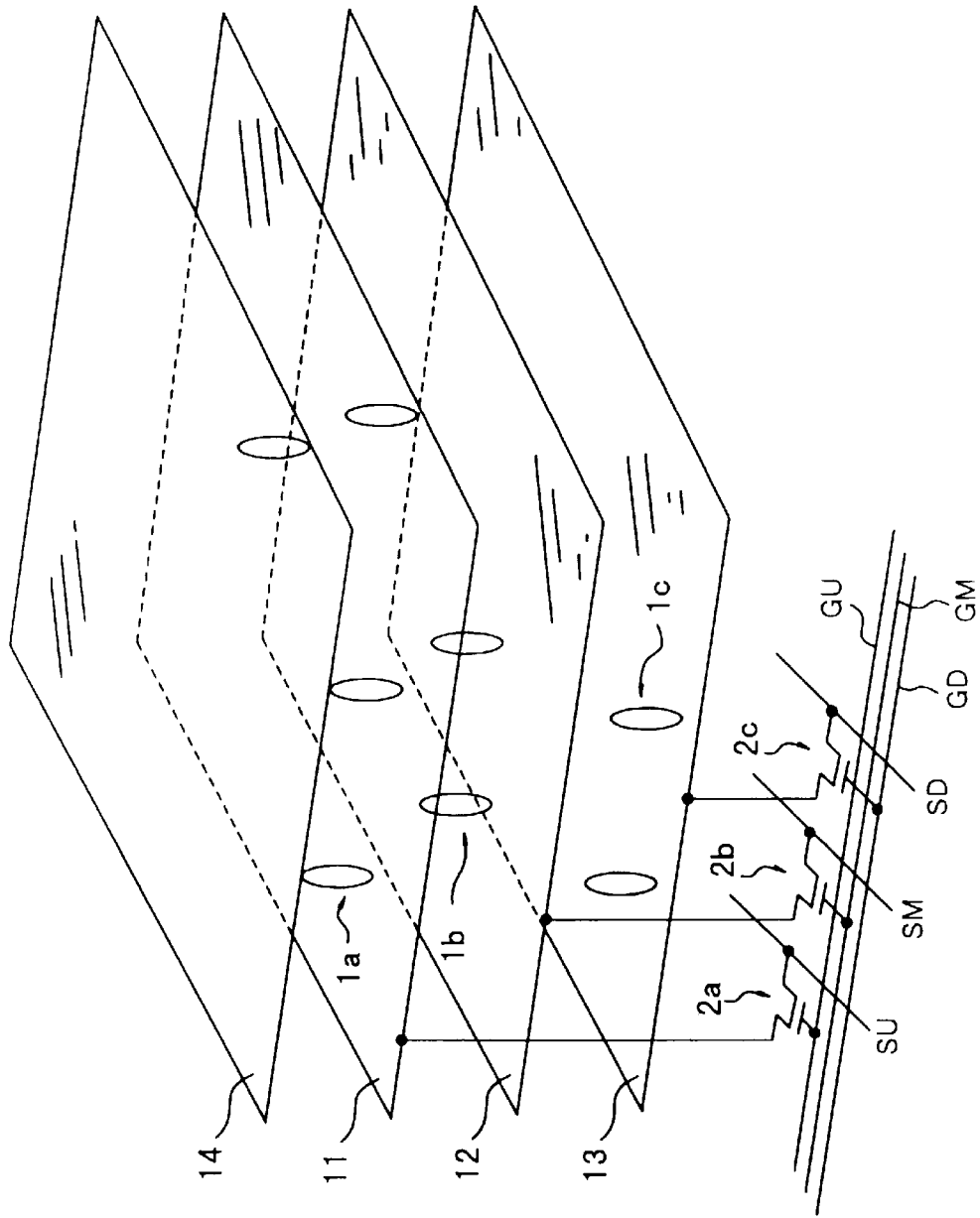
FIG. 1 is a schematic diagram showing one configuration of the liquid crystal display device of the invention.
Figure 2:
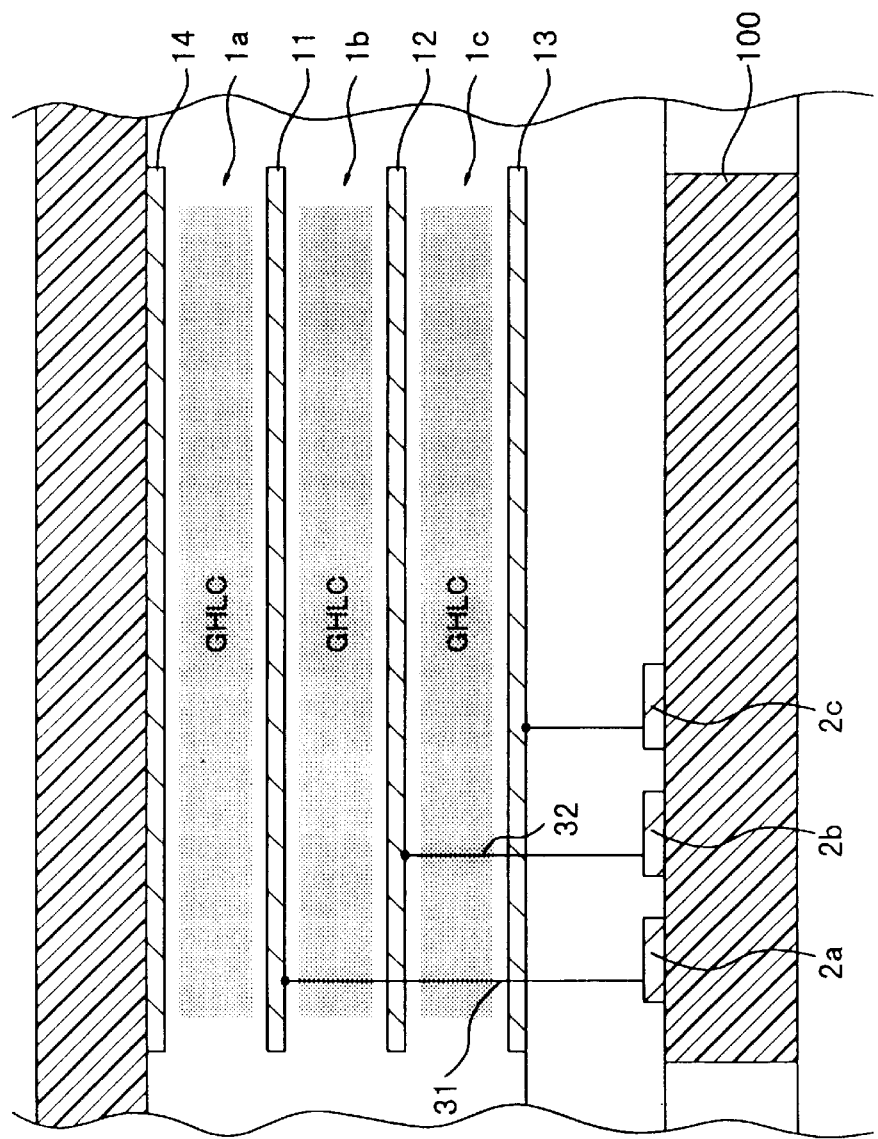
FIG. 2 is a schematic sectional view of the liquid crystal display device of the invention shown in FIG. 1.

FIG. 1 is a schematic diagram showing one configuration of the liquid crystal display device of the invention, and FIG. 2 is a schematic sectional view of the liquid crystal display device of the invention shown in FIG. 1. These figures show the configuration of a picture element. Such a picture element is formed on a substrate in a matrix pattern, so that the incident light can be modulated two-dimensionally for displaying.

A plurality of TFTs $2a$, $2b$, $2c$ are formed on an array substrate 100. A pixel electrode 13 (a third electrode) made of aluminum or the like is formed on the array substrate 100 with an insulating film interposed between them. The pixel electrode 13 also serves as a reflector. Besides, liquid crystal layers $1c$, $1b$, $1a$ are successively laid on the array substrate 100. For example, yellow, magenta and cyan GH liquid crystal layers may be laid successively. In this case, the liquid crystal layers are formed of a large number of microcapsules containing the GH liquid crystals of respective colors. These liquid crystal layers may be laid in an order as required. In addition, a pixel electrode 11 (a first electrode) and a pixel electrode 12 (a second electrode) which are made of a transparent conductive material such as ITO are respectively interposed between the neighboring layers of the liquid crystal layers $1a$, $1b$, $1c$. In the liquid crystal display device of the invention, The TFTs $2a$, $2b$, $2c$ are connected to the pixel electrodes 11, 12, 13 by the inter-connector of the invention to be described afterward.

A counter substrate 101 having a transparent counter electrode 14 (a fourth electrode) is formed on the liquid crystal layer $1c$. The counter electrode 14 may be formed for the respective liquid crystal layers. These electrodes can apply a voltage corresponding to a display signal of each liquid crystal layer.

Figure 3:
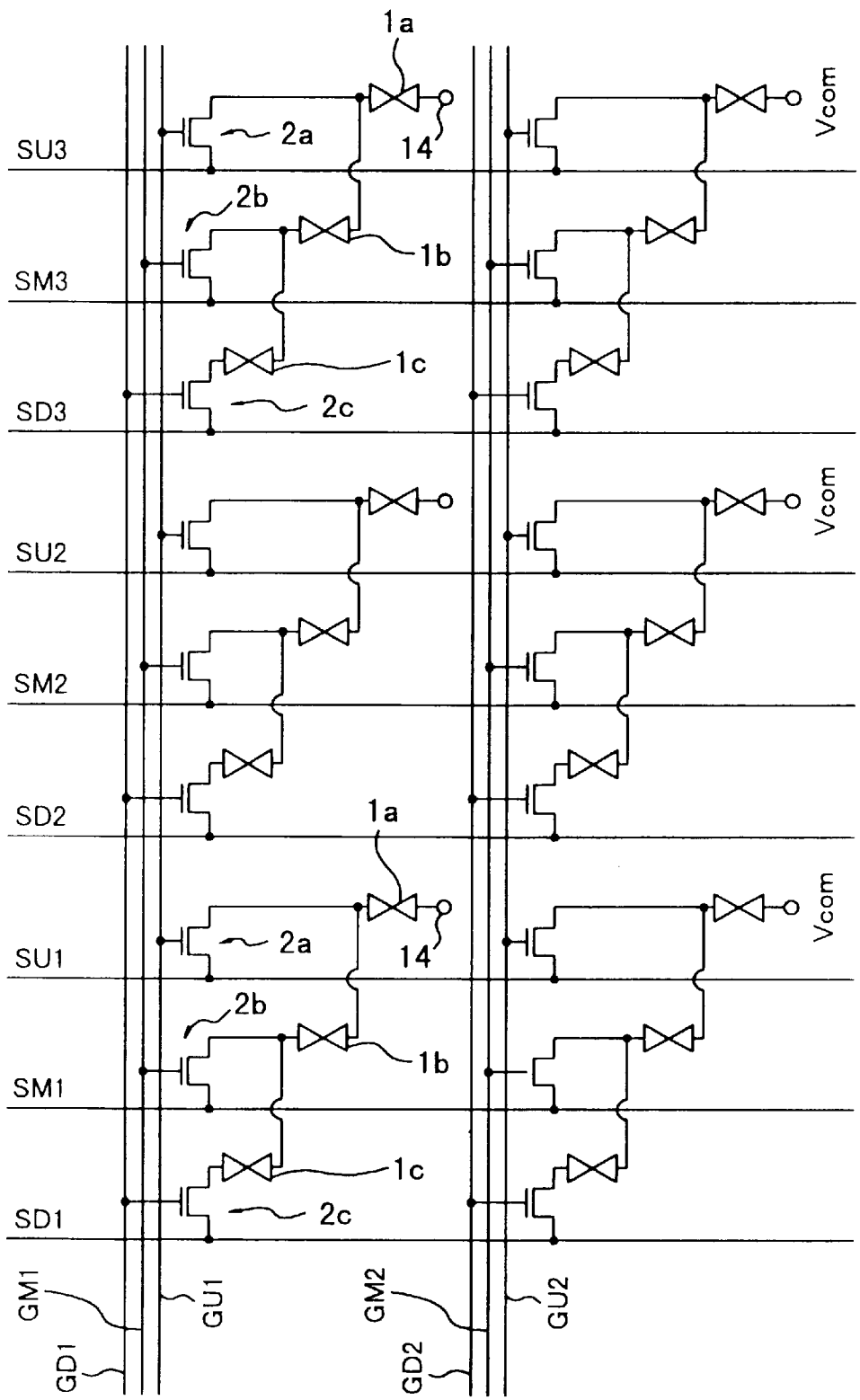
FIG. 3 and FIG. 4 are equivalent circuit diagrams of the liquid crystal display device of the invention shown in FIG. 1 and FIG. 2.

FIG. 3 is an equivalent circuit diagram of the liquid crystal display device of the invention shown in FIG. 1 and FIG. 2.

Figure 4:
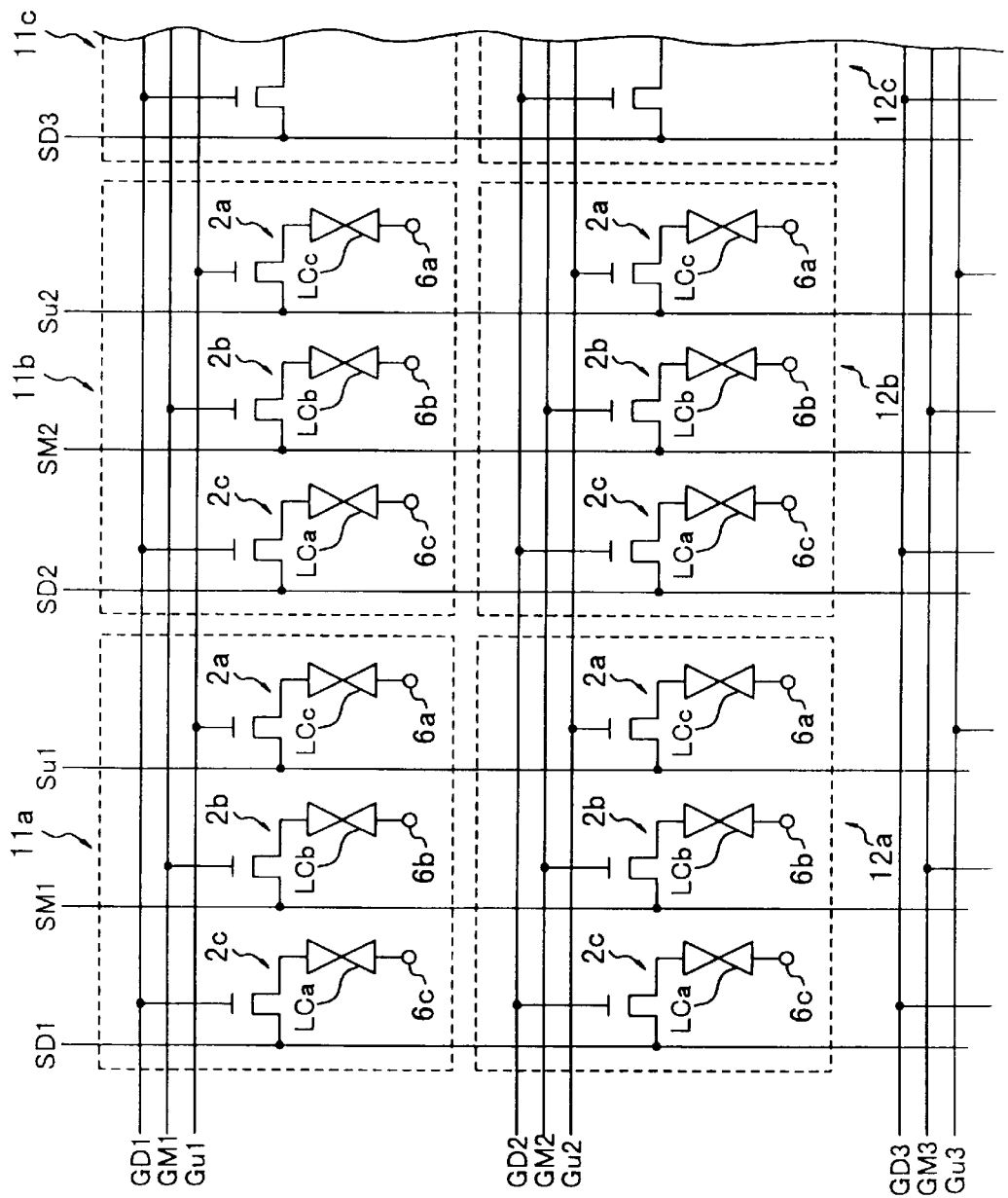

FIG. 4 is an equivalent circuit having three scanning lines GDi, GMi, GUi each independent for respective layers and also counter electrodes ($6a$, $6b$, $6c$) for respective layers so to supply selectively a display signal to the pixels of three layers configuring a single picture element.

TFT connected to signal lines SUi (SU1, SU2, SU3) is a TFT for controlling the pixel electrode 11, TFT connected to signal lines SMi (SM1, SM2, SM3) is a TFT for controlling the pixel electrode 12, and TFT connected to signal lines SDi (SD1, SD2, SD3) is a TFT for controlling the pixel electrode 13. FIG. 3 is shown plane but its actual circuit has a multi-layered structure. LCa, LCb and LCc in FIG. 3 denote liquid crystal capacities formed of the liquid crystal layers $1a$, $1b$, $1c$ and the electrodes holding such liquid crystal layers among them, Vcom denotes a voltage applied to the counter electrode 14, SU1 to SU3 and SM1 to SM3 and SD1 to SD3 denote signal lines, and GDi, GMi and GUi denote scanning lines which independently can supply a scanning signal to a switching element corresponding to the pixels of each layer.

TFT $2a$, TFT $2b$ and TFT $2c$ are electrically connected to the pixel electrode 11, the pixel electrode 12 and the pixel electrode 13 respectively. Specifically, a scanning signal is applied to a gate electrode of each TFT from a scanning line drive circuit (not shown) through scanning lines GDi, GMi, GUi. Additionally, a display signal is applied to a drain electrode of each TFT from a signal line drive circuit (not shown) through a signal line S (SDi, SMi, SDi). In this embodiment, the gate electrodes of three TFTs $2a$, $2b$, $2c$ are independently connected to the scanning lines but may be connected to a common scanning line.

When the TFT is turned on by the scanning signal, the display signal is selected and applied to the pixel electrodes connected to a source electrode. In addition, the liquid crystal layers 1a, 1b, 1c respond to an electric field formed by the respective pixel electrodes and control the alignment state and phase change state to modulate an intensity of light entering the liquid crystal layer. This light-modulated element or the pixel is formed two-dimensionally to modulate light two-dimensionally, so that an image can be displayed.
(Embodiment 2)

Figure 5A:
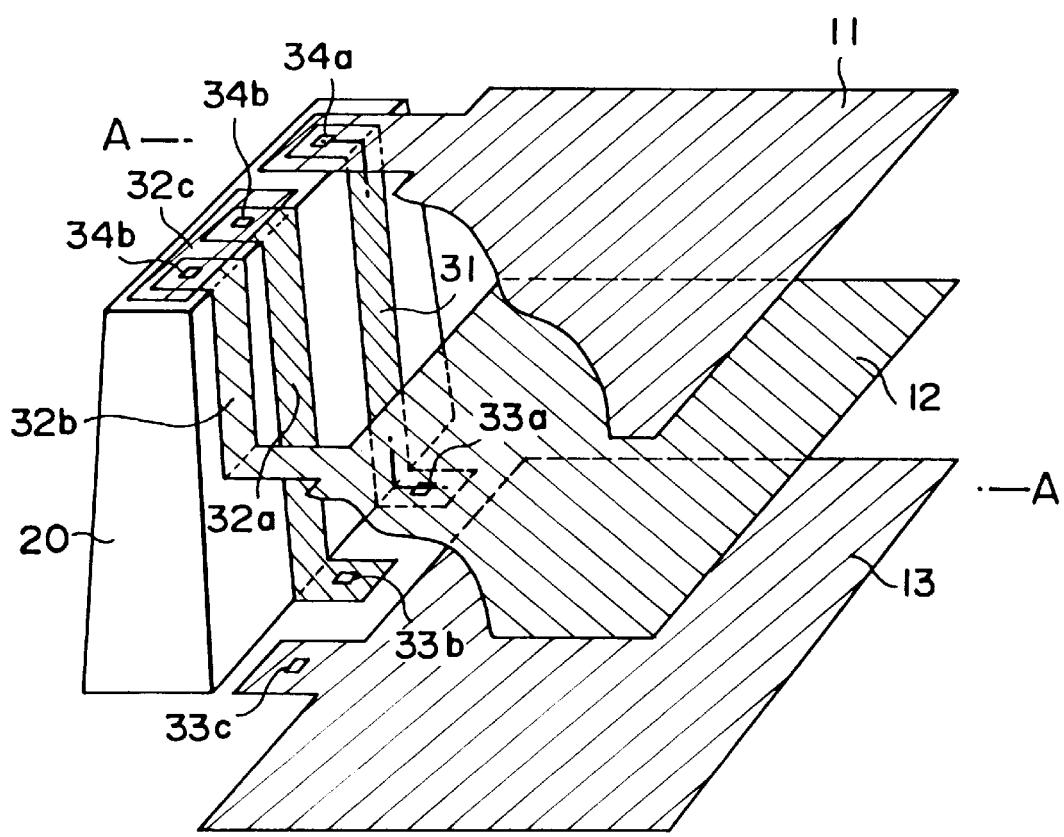
FIG. 5A is a schematic perspective view showing an interconnecting portion of the liquid crystal display device of the invention having the structure shown in FIG. 1 through FIG. 4.

FIG. 5A is a schematic perspective view showing an interconnecting portion of the liquid crystal display device of the invention having the configuration as shown in FIG. 1 through FIG. 4. FIG. 5A shows the inter-connector and pixel electrode of the invention only for simplification.

Figure 5B:
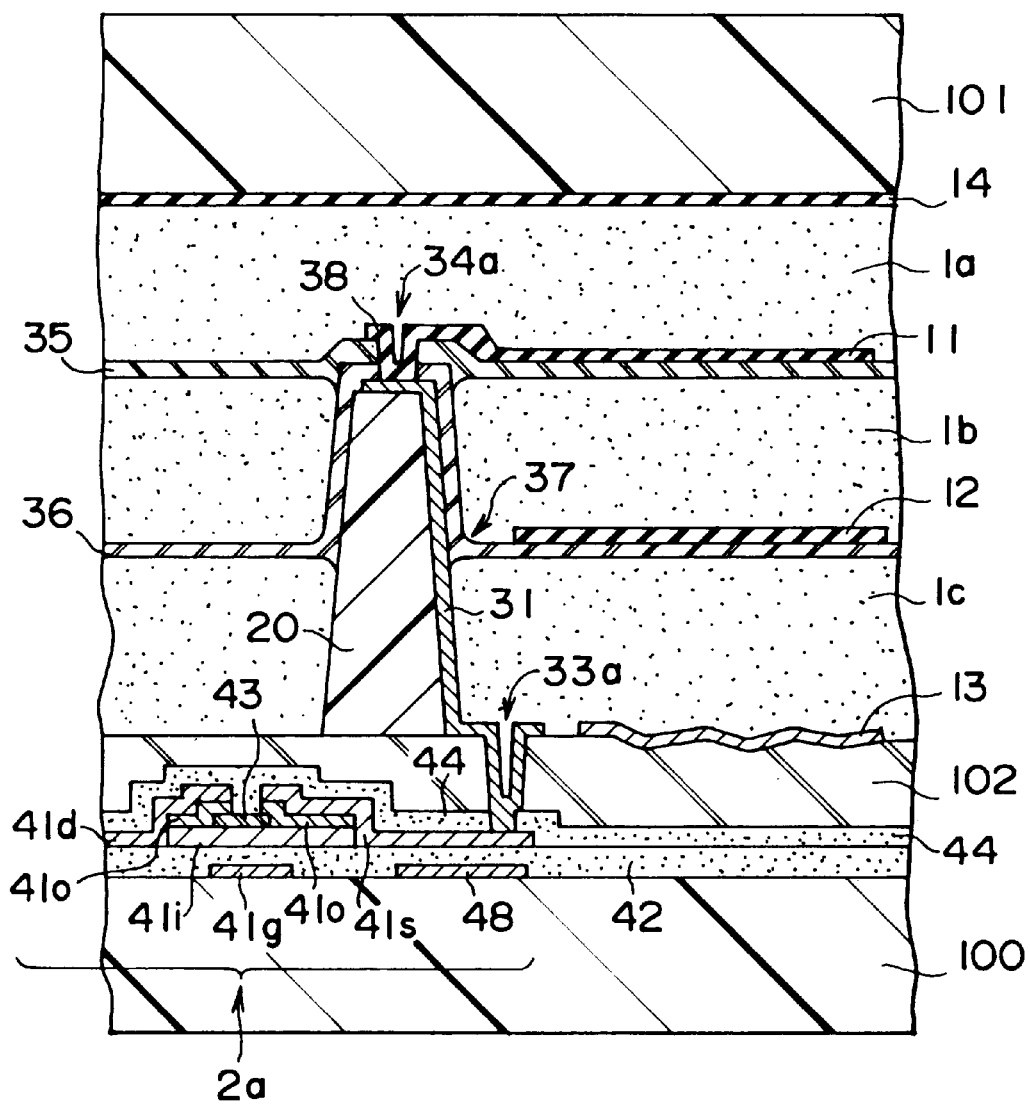
FIG. 5B is a schematic sectional view taken on line A—A of FIG. 5A.

FIG. 5B is a schematic sectional view taken on line A—A of FIG. 5A.

A pillar 20 made of an insulating material is formed on the array substrate 100. The pillar 20 is formed into a substantially truncated pyramid shape, which has a substantially rectangular base. In addition, wiring patterns 31, 32a, 32b are formed on its lateral face and top face to interconnect a display signal supply system formed on the aforementioned array substrate 100 with the pixel electrodes 11, 12 held among the liquid crystal layers.

Specifically, a first wiring pattern 31 and a source electrode 41s of TFT 2a are mutually connected through a contact hole 33a formed on a passivation insulating film 44 made of a silicon oxide (SiOx) film, a silicon nitride (SiNx) film or the like and an interlayer insulating film 102 made of SiOx, SiNx, acrylic resin, polyimide or the like. In addition, the wiring pattern 31 and the first electrode 11 are mutually connected on the top face of the pillar 20 through a contact hole 34a formed on protective films 35, 36 between the liquid crystal layers.

Similarly, a first wiring pattern 32a and a source electrode 41s of TFT 2b are mutually connected through a contact hole 33b formed on an interlayer insulating film 102 made of a silicon oxide(SiOx) film, a silicon nitride(SiNx) film, a photosensitive resin's polymer such as acrylic resin, or the like. In addition, the wiring pattern 32a and the wiring pattern 32b are mutually connected on the top face of the pillar 20 through a contact hole 34b, a conductive pattern 32c and a contact hole 34c which are formed on the protective films 35, 36 among the liquid crystal layers 1a, 1b, 1c. Additionally, the wiring pattern 32b is connected to the second electrode 12 on the lateral face of the pillar 20.

The third electrode 13 is connected to the source electrode 41s of TFT 2c through a contact hole 33c.

Figure 6A:
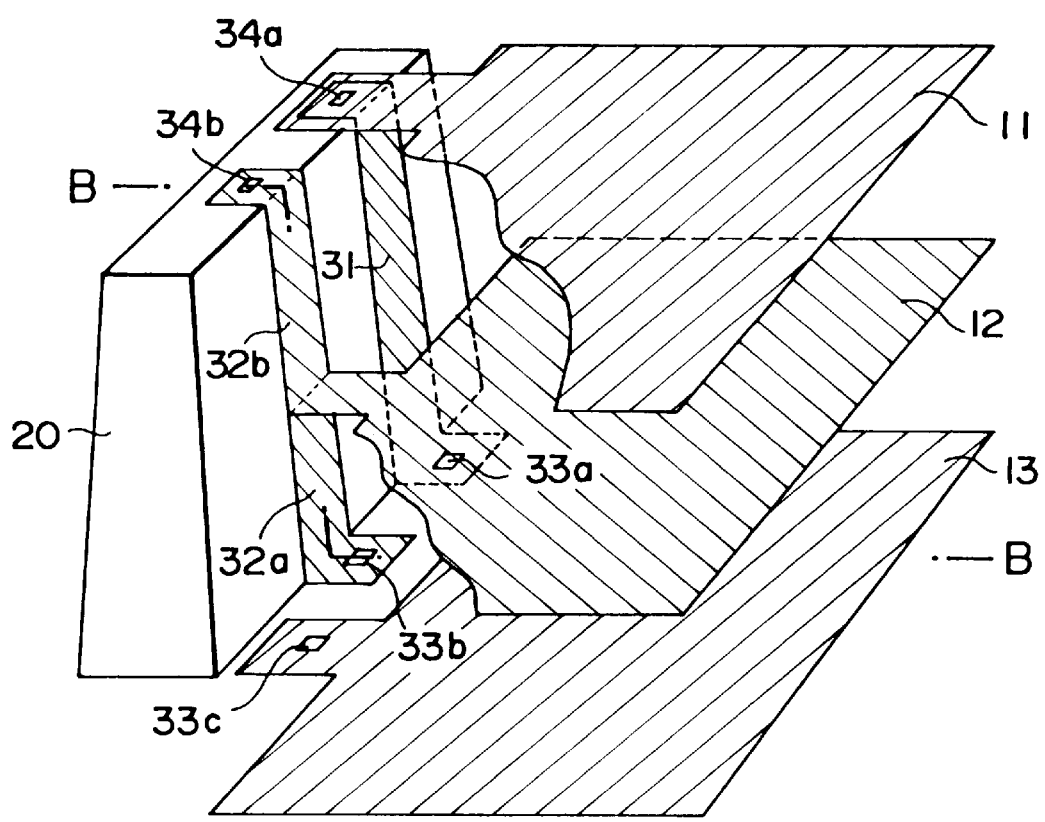
FIG. 6A is a schematic perspective view showing another interconnecting portion of the liquid crystal display device of the invention configured as shown in FIG. 1 through FIG. 4.

FIG. 6A is a schematic perspective view showing another interconnection of the liquid crystal display device of the invention configured as shown in FIG. 1 through FIG. 4. The figure shows only the inter-connector and pixel electrode of the invention for simplification.

Figure 6B:
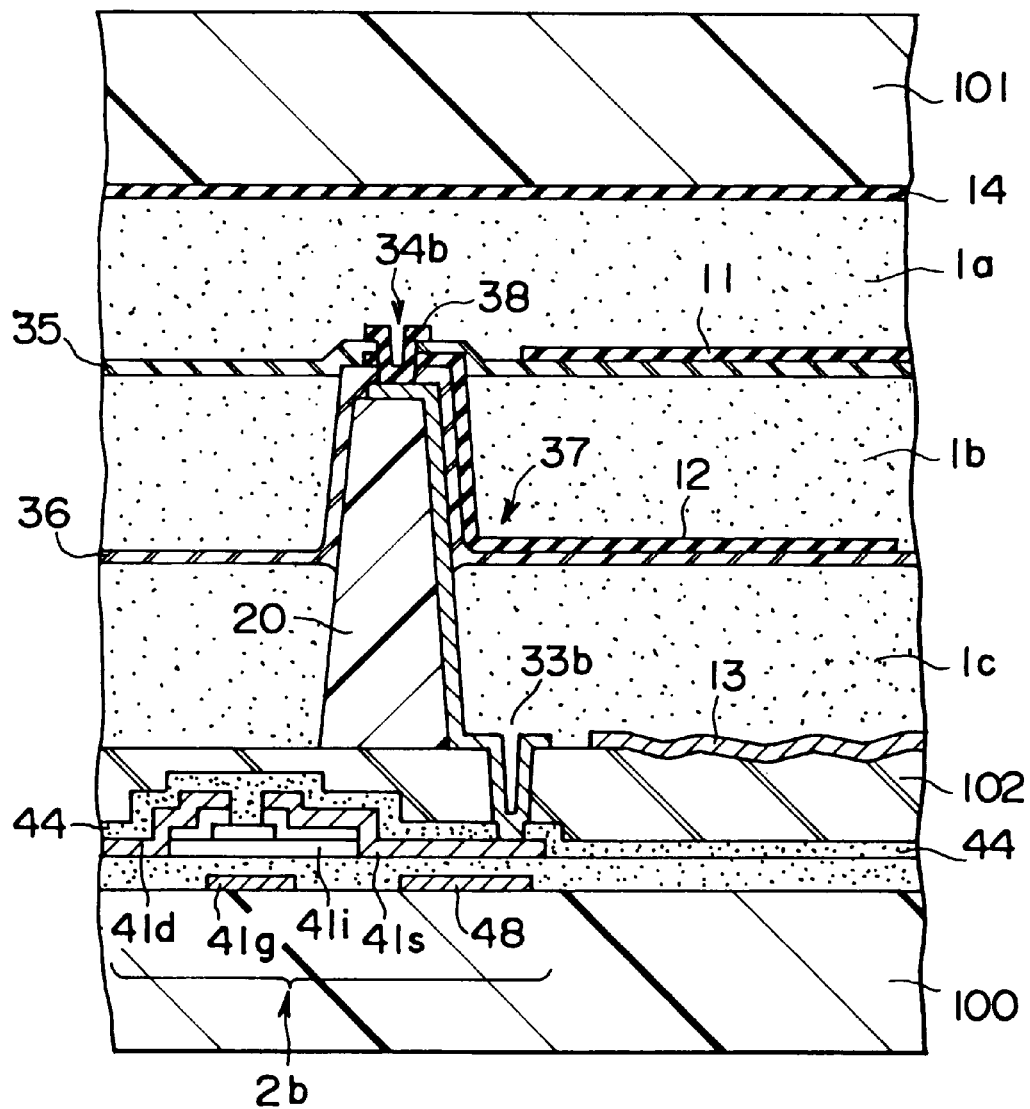
FIG. 6B is a schematic sectional view taken on line B—B of FIG. 6A.

FIG. 6B is a schematic sectional view taken on line B—B of FIG. 6A.

The pillar 20 made of an insulating material is formed on the array substrate 100. The pillar 20 is formed into a substantially truncated pyramid shape, which has a substantially rectangular base (bottom face). In addition, wiring patterns 31, 32a, 32b are formed on its lateral face and top face to interconnect a display signal supply system formed on the aforementioned array substrate 100 with the pixel electrodes 11, 12 held among the liquid crystal layers.

Specifically, a first wiring pattern 31 and a source electrode 41s of TFT 2a are mutually connected through a contact hole 33a formed on an interlayer insulating film 102 made of a silicon oxide (SiOx) film or a silicon nitride (SiNx) film. In addition, the wiring pattern 31 and the first electrode 11 are mutually connected on the top face of the pillar 20 through a contact hole 34a formed on a protective film 35 between the liquid crystal layers.

Similarly, the first wiring pattern 32a and the source electrode 41s of TFT 2b are mutually connected through a contact hole 33b formed on interlayer insulating films 44, 102 made of a silicon oxide film SiOx or a silicon nitride film SiNx. In addition, the wiring pattern 32a and the wiring pattern 32b are laminated on the lateral face of the pillar 20 with a protective film 36 interposed between them. In addition, the wiring pattern 32a and the wiring pattern 32b are mutually connected on the top face of the pillar 20 through a contact hole 34b formed on the protective film 35 among the liquid crystal layers. Additionally, the wiring pattern 32b is connected to the second electrode 12 on the lateral face of the pillar 20.

The third electrode 13 is connected to the source electrode 41s of TFT 2c through a contact hole 33c.

In the configurations shown in FIG. 5A, FIG. 5B, FIG. 6A and FIG. 6B, a connecting portion 37 between the second electrode 12 and the wiring pattern 32b is preferably formed into a shape such as a curved form to prevent a stress from being concentrated on it. Otherwise, a stress is concentrated onto the connecting portion 37 due to a difference in thermal expansion coefficient of a conductive pillar, a wiring pattern or a liquid crystal layer, possibly degrading the reliability of connection. The connecting portion 37 may be formed of, for example, a transparent protective film 36 which is formed to have a gentle curve. Besides, a binding material for bonding the microcapsules mutually may be used to form a smoother curved shape. The smooth curved shape can be formed owing to affinity between the binding material and the pillar 20, the wiring patterns 31, 32a and others.

Three-layered liquid crystal layers 1a, 1b, 1c are divided by protective films 35, 36 to prevent liquid crystal microcapsules from leaking through a gap between the liquid crystal layers. Pixel electrodes 11, 12 are formed among the liquid crystal layers 1a, 1b, 1c. Electric potential. corresponding to a display signal is applied to the pixel electrodes 11, 12, a bottom pixel electrode 13 and a top counter electrode 14 to make the liquid crystal layers 1a, 1b, 1c respond optically to modulate light entering into the picture elements. The liquid crystal layer 1a for magenta, the liquid crystal layer 1b for cyan and the liquid crystal layer 1c for yellow which are the subtractive three primary colors are stacked in this embodiment.

TFTs 2a, 2b, 2c are formed on each picture element region. These TFT arrays are formed on the substrate 100 made of glass or plastic, and a source train electrode 9 and intermediate pixel electrodes 17, 20 of TFT 2 as a nonlinear element are connected by the wiring pattern 13 as a connecting conductor.

TFT 2a and TFT 2b shown in FIG. 5B and FIG. 6B have a bottom gate type structure having a-Si (amorphous silicon) as a channel semiconductor film. This TFT comprises a gate electrode 41g made of MoTa, MoW or the like; a gate insulating film 42 made of an SiNx/SiOx laminate film; a channel semiconductor film 41i made of intrinsic a-Si; a channel protective insulating film 43 made of SiNx or the like; a source electrode 41s bonded by ohmic contact with the channel semiconductor film 41i with a contact layer 41o interposed therebetween; a drain electrode 41d; and a passivation film 44 made of SiNx or the like. The source electrode 41s and the drain electrode 41d may be made of MO or Mo/Al laminated film. In addition, the contact layer 41o may be made of n⁺a-Si, n⁺microcrystal silicon or the like having impurity ions doped.

In the liquid crystal display device of the invention, the nonlinear switching element as means for applying the display signal to each pixel electrode may be TFT having another structure. It may be, for example, a top gate type, a stagger type, or a planer type, and the material for the channel semiconductor film 41i may be polycrystalline silicon (poly-Si, μc-Si) or the like in addition to the amorphous silicon. A compound semiconductor such as CdSe may also be used. The TFT in the invention can be configured in various ways. In addition, a nonlinear switching element such as MIM may be used in addition to TFT.

In addition to an active matrix type that one nonlinear switching element is formed in correspondence with one pixel electrode, a circuit such as flip-flop circuit may be formed for respective pixel electrodes to enable the application of a predetermined AC voltage to the liquid crystal layer. Thus, the circuit may have a plurality of TFTs or a diode such as MIM.

This embodiment has a storage capacity (Cs) between a bottom electrode (storage capacity line) 48 and the drain electrode 41d of TFT.

As described above, TFTs 2a, 2b, 2c are formed in an array form on the array substrate 100, and the means for applying the display signal selects the display signal to apply to the respective pixel electrodes 11, 12, 13. In addition, the applying means and the pixel electrodes 11, 12 held between the liquid crystal layers are interconnected by the interconnector of the invention having the pillar 20 described above.

FIG. 5A and FIG. 5B and also FIG. 6A and FIG. 6B show two different types of connecting methods. In FIG. 5A and FIG. 5B, the wiring pattern 32a and the wiring pattern 32b are formed at different positions on the lateral face of the pillar 20 and connected mutually by the conductive pattern 32c and a connecting electrode 38 formed in the through holes 34a, 34b on the top face of the pillar 20. On the other hand, in FIG. 6A and FIG. 6B, the wiring pattern 32a and the wiring pattern 32b are stacked on the lateral face of the pillar 20 and mutually connected through the through hole 34b. The method shown in FIG. 5A and FIG. 5B has an advantage that the through hole does not have side etching and the connecting electrode 38 hardly suffers from a disadvantage due to step disconnection. In addition, the connecting method shown in FIG. 6A and FIG. 6B has the wiring pattern 32a and the wiring pattern 32b overlaid on the same plane. Therefore, it has an advantage that an area required to form the wiring patterns can be made small. The latter can have the pillar 20 with a small width and the pixel electrodes 11, 12, 13 can be made large in size, so that the picture element can have an improved aperture ratio.

The configuration described above is of a reflection type liquid crystal display device. Also, the invention can be generally applied to any liquid crystal display device having a structure with a plurality of liquid crystal layers stacked. For example, the invention is not limited to the reflection type but can also be applied to a transmission type liquid crystal display device.

In addition, the liquid crystal display device of the invention may integrally form TFTs 2a, 2b, 2c and a drive circuit therefor on the array substrate 100. It is preferable that TFT for the drive circuit and TFT for the pixel are configured using poly-Si as the channel semiconductor film.
(Embodiment 3)

A method of manufacturing the liquid crystal display device of the invention will be described. In this embodiment, a method of manufacturing the liquid crystal display device configured as shown in FIG. 6A and FIG. 6B will be described.

Figure 7A:
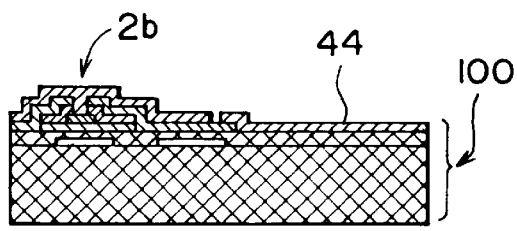
FIG. 7 A, FIG. 7B, FIG. 7C, FIG. 7D, FIG. 7E, FIG. 7F, FIG. 7G, FIG. 7H, FIG. 7I, FIG. 7J, FIG. 7K, FIG, 7L.
FIG. 7M, FIG. 7N, FIG. 7O, FIG. 7P, FIG. 7Q, and FIG. 7R are diagrams illustrating a method of manufacturing the liquid crystal display device of the invention.
Figure 7B:
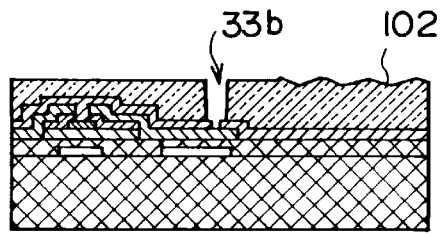
Figure 7C:
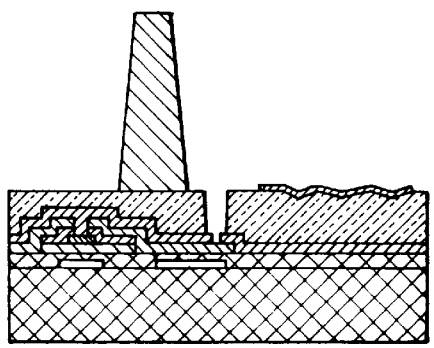
Figure 7D:
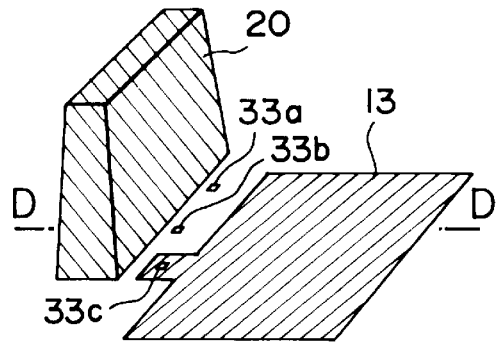
Figure 7E:
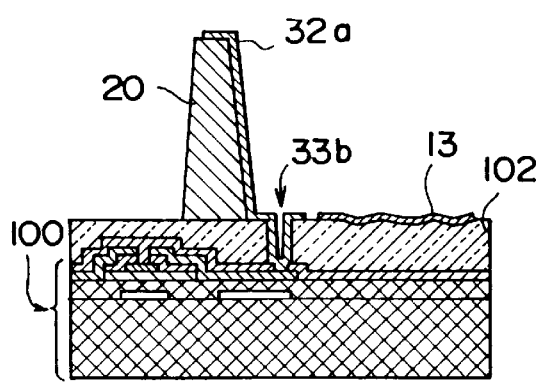
Figure 7F:
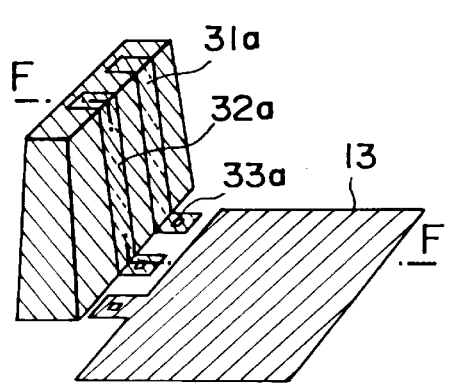
Figure 7G:
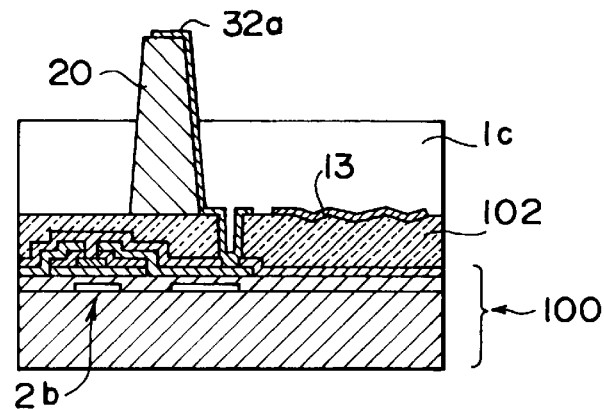
Figure 7H:
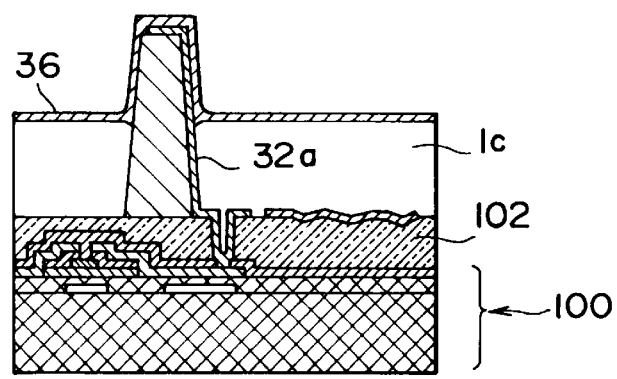
Figure 7I:
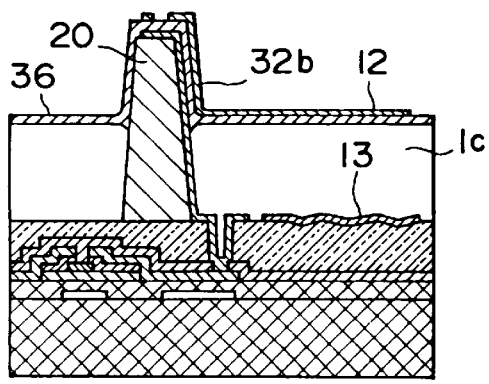
Figure 7J:
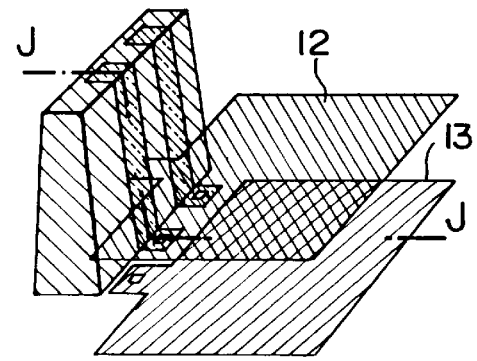
Figure 7K:
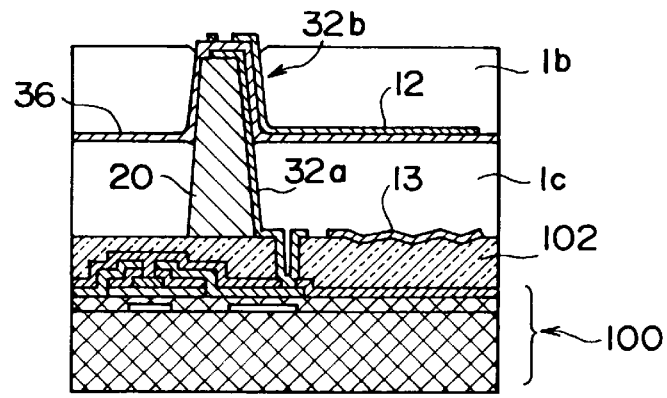
Figure 7L:
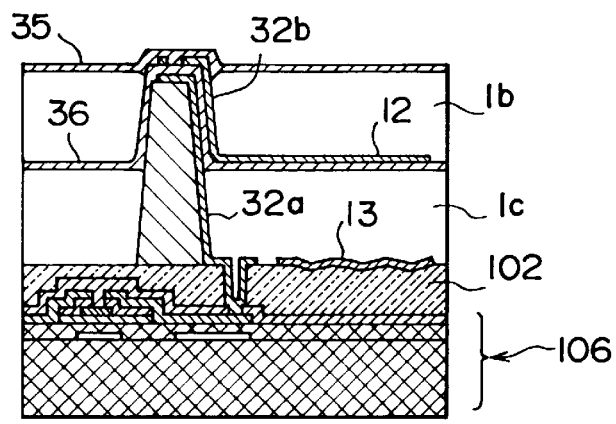
Figure 7M:
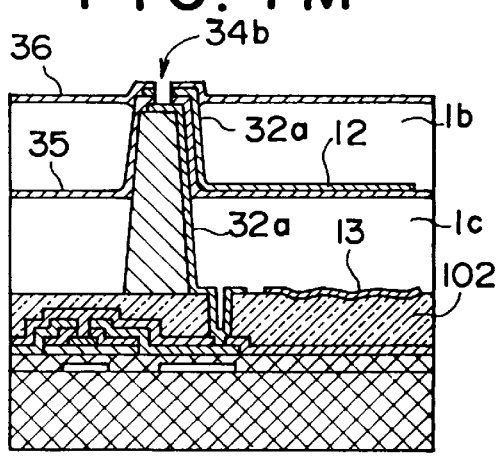
Figure 7N:
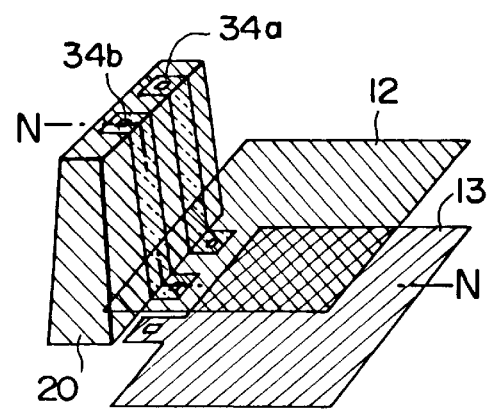
Figure 7O:
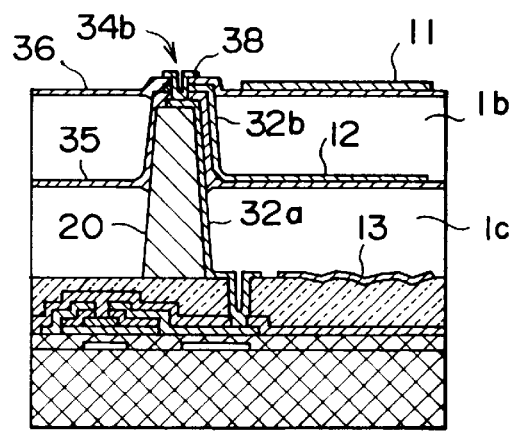
Figure 7P:
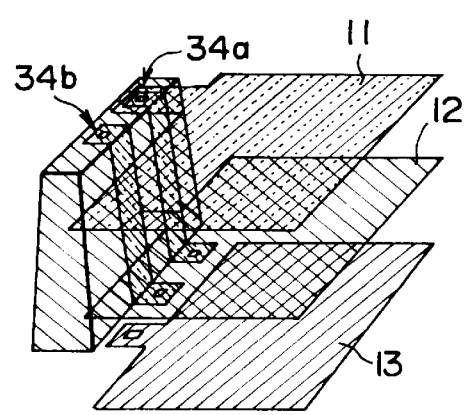
Figure 7Q:
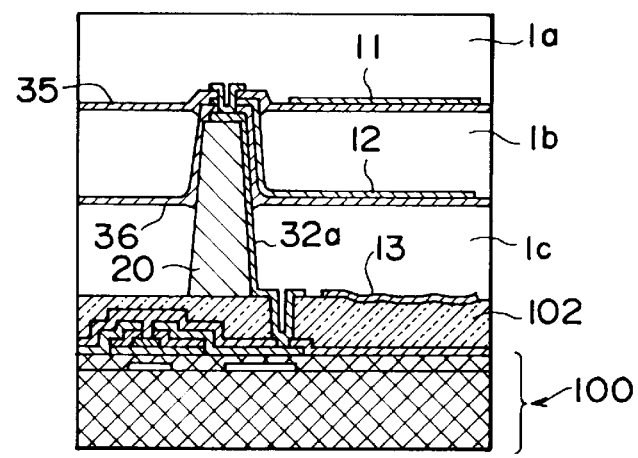
Figure 7R:
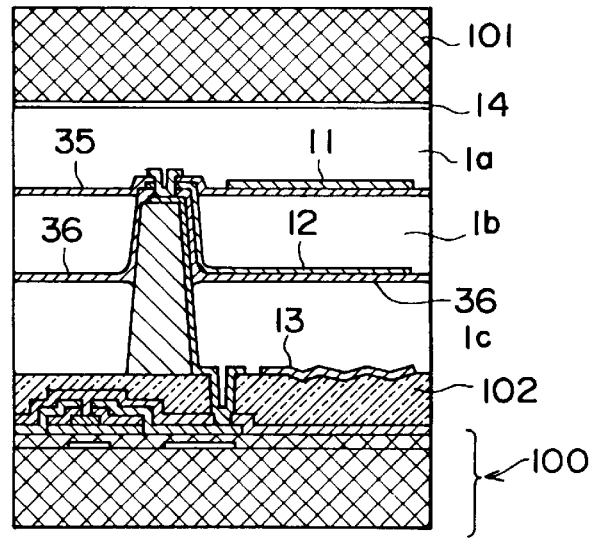

FIG. 7A through FIG. 7R are diagrams for illustrating a method of manufacturing the liquid crystal display device of the invention.

First, an array substrate 100 is prepared on which the above-described thin film transistor array is formed (FIG. 7A).

Additionally, an interlayer insulating film 102 is formed on the array substrate 100. At the time, irregularities are formed in advance by a photoetching process or the like in order to give scattered reflecting properties to through holes 33a, 33b, 33c and a pixel electrode 14 (FIG. 7B). The interlayer insulating film 102 is made of photosensitive acrylic resin, photosensitive/non-photosensitive BCB (benzocyclobutene), polyimide or the like by exposing and developing and then heating to 200 to 350° C. for curing. The interlayer insulating film 102 may be made of an inorganic material such as silicon oxide, silicon nitride or the like and not limited to a particular material if an insulating property can be secured.

The pixel electrode 14, which also serves as a reflector, is formed on the interlayer insulating film 102. For example, it is formed by depositing aluminum to a thickness of about 200 nm by sputtering or the like, also deposing a photoresist thereon, exposing and developing the photoresist, and etching the aluminum film with the photoresist as a mask. The through holes 33a, 33b, 33c may be formed after forming the pixel electrode 14.

A pillar 20 is then formed to have a lateral face and a top face using an insulating material such as photosensitive resin or the like. The pillar 20 is formed into a truncated pyramid shape for example, but its shape is not limited to the truncated pyramid shape. For example, it may be formed into a bank shape, a prism shape such as a triangular or quadratic prism, or a cylindrical shape. In any event, it is preferable to have a top face so that it is secure and reliable to form the contact holes 34a, 34b, 34c and to connect the wiring pattern. When the pillar 20 has the truncated pyramid shape, its lateral face on which wiring patterns 31, 32 are formed has a tapered shape not having an overhang when viewed from the side of the array substrate 100, and patterning can be made by photoetching or the like. In addition, the wiring patterns 31, 32 can be prevented from being broken at a sharp corner. When the pillar 20 is formed to have the truncated pyramid shape, its flat top face may have rounded edges.

The pillar 20 was formed by coating a photosensitive resin to a thickness of about 20 μm by spin-coating or the like and forming a pattern by exposing and developing. Such a state is shown in a sectional view of FIG. 7C. FIG. 7D is a perspective view showing the same sate. FIG. 7C is a sectional view taken on line D—D of FIG. 7D.

The pillar 20 may also be made of the same material such as photosensitive acrylic resin, photosensitive BCB (benzocyclobutene), non-photosensitive BCB, polyimide or the like as used for the interlayer insulating film 102. Such a resin is exposed and developed into a predetermined shape and heated to about 200 to 350° C. for thoroughly curing. The pillar 20 is preferably made to have a height of about 1.5 to about 4 times of a thickness of a single liquid crystal layer. If the liquid crystal layer is formed without involving (to repel) the pillar 20, its top face is exposed even if an aspect ratio is lowered to about 1.5 times. Additionally, even if affinity between the liquid crystal layer and the pillar 20 is high and the liquid crystal layer rises along the lateral face of the pillar 20 owing to the surface tension, the top face can be exposed by increasing the aspect ratio to about 4 times. Generally, the pillar 20 is suitably determined to a height falling in a range of about two to about three times of the thickness of each liquid crystal layer. The pillar 20 has a height of 20 μm in this embodiment, but it may be set to about 10 μm when the liquid crystal layer has a thickness of 5 μm.

After forming the pillar 20 on the interlayer insulating layer 102 as described above, a conductor such as molybdenum Mo is formed into a film having a thickness of about 300 nm by, for example, spattering, a photoresist is coated thereon to a thickness of 20 μm, and wiring patterns 31a, 32a are formed at the same time by exposing, developing and etching (FIG. 7E, FIG. 7F). Mo is undergone dry-etching with $CF_4$ gas. The material of the wiring pattern is not limited to Mo but may be made of copper (Cu), nickel (Ni), aluminum (Al), tantalum (Ta), tungsten (W), titanium (Ti), an alloy thereof, a laminated film thereof, ITO, an organic conductive film, or an organic film containing conductive particles.

A liquid crystal layer 1c is then formed to a thickness of about 10 μm (FIG. 7G). The liquid crystal layer 1c is formed by preparing microcapsules having a thin transparent skin and containing a guest host liquid crystal, dispersing the microcapsules into appropriate pure water or alcohol to form a liquidus slurry, coating the slurry into a single layer or multiple layers, and drying it or them. When the slurry is dried, the microcapsules are mutually adhered to form the liquid crystal layer into an independent form.

The liquid crystal layer 1c may also be formed by dispersing the microcapsules into an organic resin and curing them together with the organic resin. The organic resin preferably has a high dielectric constant. The dielectric constant is preferably 6 or more or higher than the dielectric constant of the liquid crystal layer because a voltage drop becomes small. In addition, polymer dispersion type guest host liquid crystal may also be used. In this case, an ultraviolet-curing resin and a guest host liquid crystal are mixed, and ultraviolet ray is irradiated to the mixture to make a phase separation of the polymer of the ultraviolet-curing resin from the liquid crystal layer. Thus, a liquid crystal layer having the liquid crystal dispersed into a polymer matrix can be formed. In producing the liquid crystal layers described above, a load may be applied to the liquid crystal layer from above to harden it to form a flat surface. The liquid crystal layer is determined to have a proper thickness in view of the optical properties, speed of response and the like of the liquid crystal layer. For example, the guest host liquid crystal has a thickness of 2 to 20 μm so that solubility not depositing a pigment, a two color ratio and a chiral pitch not producing hysteresis can be obtained easily. In this case, the liquid crystal layer 1c is a GH liquid crystal layer containing a yellow pigment. The liquid crystal layer can have a selective reflection mode for reflecting light having a given wavelength. The liquid crystal layer having the selective reflection mode can be achieved by using a cholesteric liquid crystal, holographic PDLC or the like. To do so, the pixel electrode 13 is transparent or black, and the interlayer insulating film 102 may be made of a light-absorbing material or a black color material.

In addition, an insulating protective film 36 made of acrylic resin or the like is coated on the liquid crystal layer 1c to a thickness of about 0.1 to 3 μm (FIG. 7H). The protective film 36 is preferably made of a material having a high dielectric constant (about 3 to about 8). And it may be formed by any method such as a spin coating, a spray method, a slit-coating method, or a printing method (offset). It is preferable that the protective film 36 has a curved surface on the boundary between the lateral face of the pillar 20 and the liquid crystal layer 1c. Thus, a stress applied to the wiring pattern due to, for example, a difference in thermal expansion coefficient is relieved, and the reliability of connection is improved.

A transparent conductive film of ITO or the like is then laminated onto the protective film 36 and patterned to form a pixel electrode 12 (FIG. 7I, FIG. 7J). FIG. 7I is a sectional view showing the configured structure, and FIG. 7J is a perspective view of the same configuration. FIG. 7I shows the sectional structure taken on line J—J of FIG. 7J. The ITO film is formed by evaporating a target indium-tin oxide (ITO) by injecting ions against it by hollow cathode discharging so to be formed on the substrate heated to room temperature or about 120° C. The ITO film may also be formed by a DC magnetron sputtering method or an ECR sputtering method. In addition, the pixel electrode 12 may be made of an organic transparent conductive film. The transparent conductive film may be made of ITO and zinc oxide or by adding zinc oxide to ITO.

The protective film 36 is effective to improve resistance against chemicals used for etching of ITO and separating the resist. In addition, the protective film 36 is also effective to improve adhesion with the pixel electrode 12.

Furthermore, when the liquid crystal layer is made using the microcapsules and the like, irregularities produced on the surface of the liquid crystal layer, particularly those on the boundary 37 produced owing to affinity between the pillar and the neighboring wiring pattern 32, are relieved by the protective film 36. Thus, a conduction failure such as step disconnection can be prevented from occurring in connecting to the pixel electrode 12.

Patterning forms the pixel electrode 12 and also a wiring pattern 32b (a second portion) which runs along the lateral face of the pillar 20 to reach its top face at the same time. The wiring pattern may be formed by a printing method in addition to the photolithography.

The liquid crystal layer 1b is then formed in the same manner as the liquid crystal layer 1c (FIG. 7K). The Liquid crystal layer 1b is formed using GH liquid crystal microcapsules containing cyan pigment.

A protective film 35 made of acrylic resin is formed on the liquid crystal layer 1b (FIG. 7L). The protective film 36 is formed in the same manner as the protective film 35. In addition, the protective film 35 and the protective film 36 may be made of the same material or a different material.

A through hole 34b is formed on the protective film 35 on the top face of the pillar 20 to connect the wiring patterns 32a, 32b to the pixel electrode 12 (FIG. 7M). FIG. 7M is a sectional view showing that the through hole 34b is formed. Additionally, FIG. 7N is a perspective view showing the same state. FIG. 7M shows the sectional structure taken on line N—N of FIG. 7N.

After forming the through hole 34b, a pixel electrode 11 is formed on the protective film 35 (FIG. 7O). FIG. 7O is a sectional view showing that the pixel electrode 11 is formed. In addition, FIG. 7P is a perspective view showing the same state. FIG. 7O shows the sectional structure taken on Line PP of FIG. 7P. At the same time, a connecting electrode 38 is formed to connect the pixel electrode 12 to the wiring pattern 32a and the wiring pattern 32b. As a through hole formed on the top face of the pillar 20, the through hole 34b was referred to. But the through hole 34a and the through hole 34c for connecting the pixel electrode 11 and the pixel electrode 12 are also formed in the same way (FIG. 5A, FIG. 5B, FIG. 6A, FIG. 6B).

Then, a liquid crystal layer 1a is formed on the pixel electrode 11 (FIG. 7Q). This liquid crystal layer is formed of GH liquid crystal microcapsules containing magenta pigment.

A counter substrate 101 having a counter electrode 14 is formed on the liquid crystal layer 1a to complete the liquid crystal display device of the invention (FIG. 7R).

The counter electrode 14 is made of a transparent conductive film such as ITO formed on the counter substrate 101. The counter substrate 101 is firmly fixed to the liquid crystal layer 1a by pressing against it. Alternatively, the counter electrode 14 may be formed on the liquid crystal layer 1a by sputtering, and the counter substrate 101 may be formed thereon as a cover. The counter substrate 101 serves as a cover for the liquid crystal layer but is not essential. The counter substrate 101 may be replaced by a transparent resin such as the protective films 35, 36 which is cured to have a larger thickness to serve as a cover.

As described above, the liquid crystal display device of the invention can be produced by previously forming the inter-connector which consists of the pillar and the wiring pattern before laminating a plurality of liquid crystal layers. Accordingly, the production process can be made simple and the production cost is decreased.

The liquid crystal display device of the invention has the respective pixel electrodes connected with the respective wiring patterns on the top face of the pillar 20. Therefore, even if the through hole has a connection failure, such a failure can be remedied by irradiating laser beams from the side of the counter substrate 101 to the defective connection. Thus, a yield can be improved.

In addition, the pillar 20 may be determined to have a height so to correspond with a space between the array substrate 100 and the counter substrate 101 to use the pillar 20 as a spacer. In addition, by adjusting the pillar 20 to a height equal to three liquid crystal layers, a space between the array substrate 100 and the counter substrate 101 can be held by the pillar 20. In addition, a load applied to the liquid crystal layer 1a can also be dispersed. To do so, a portion of the counter electrode 14 corresponding to the top face of the pillar 20 can be removed by patterning.

The protective films 35, 36 are effective to improve a chemical resistance of the liquid crystal layer but may not be required by improving the skin of the microcapsules and the dispersion matrix. In addition, the process forming the through hole 34a, 34b or 34c can be omitted. The connection reliability can also be improved by having a larger contact area between the wiring pattern and the pixel electrode. For example, the wiring pattern 32a and the wiring pattern 32b can also be connected on the lateral face of the pillar 20. When the protective films 35, 36 are omitted and the dispersion matrix of microcapsules forms a film, the protective film can also be formed at the same time, so that the process to form a through hole is required. Even in such a case, the protective film forming process can be omitted. Thus, productivity can be improved, and the production cost can be decreased.

Through the step described above, the liquid crystal display device having the picture element structured as shown in FIG. 6A and FIG. 6B can be produced.

Figure 8:
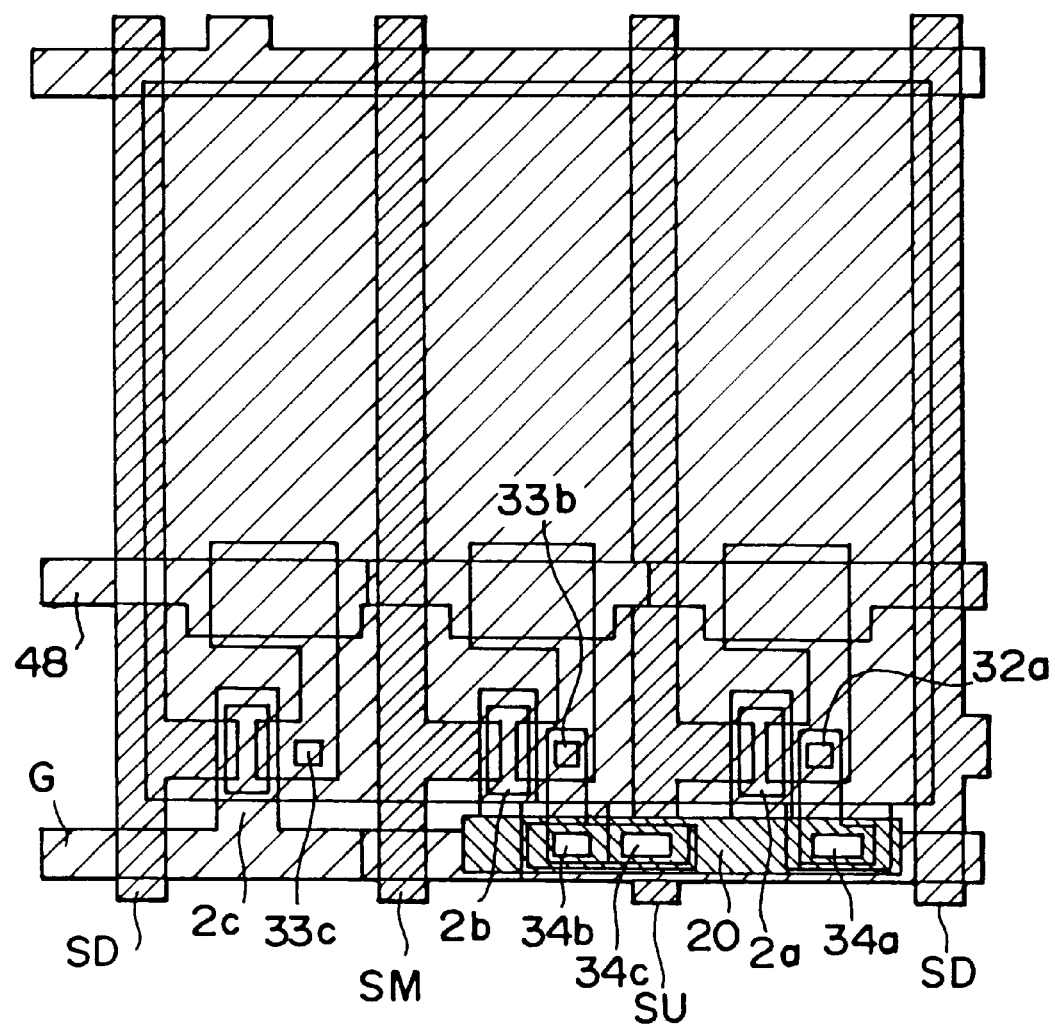
FIG. 8 is a schematic diagram showing a plane structure of a picture element of the liquid crystal display device of the invention.

FIG. 8 is a schematic plan diagram showing the structure of a picture element of the liquid crystal display device of the invention. The picture element has a size of about 100 $\mu$m square in this embodiment but can be made smaller. And the liquid crystal display device can be configured without causing a parallax.

FIG. 8 shows that gate electrodes of thin film transistors 2a, 2b, 2c are connected to a common gate line G but may be connected to separate gate lines as shown in FIG. 1.

The pillar 20 is formed on the gate line G, and the pixel electrodes 11, 12, 13 are formed to overlay the gate line G and signal lines 85a, 85b, 85c. The figure shows the pillar 20 with its top face only. The pillar may be formed where no pattern is formed below it, so that flatness of a position where the pillar is formed can be improved, and patterning accuracy can be enhanced. In addition, the storage capacity can also be formed by using substantially the entire picture element region. Furthermore, a shield electrode (not shown) can be formed to cover the TFT 2, signal lines SU, SM, SD, gate line G and the like, and the pixel electrode is formed thereon. Thus, coupling can also be reduced.

(Embodiment 4)

FIG. 9, FIG. 10, FIG. 11 and FIG. 12 are diagrams showing various forms of liquid crystal layers of the liquid crystal display device of the invention.

Figure 9:
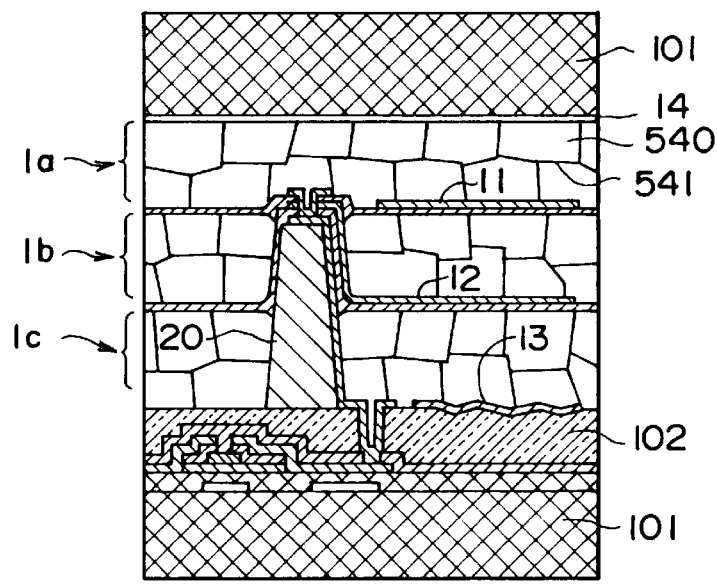
FIG. 9, FIG. 10, FIG. 11 and FIG. 12 are diagrams showing the forms of liquid crystal layers of the liquid crystal display device of the invention.

FIG. 9 shows that a layer of liquid crystal microcapsules made of liquid crystals (droplets) 540 divided by partitions 541 is formed into a plurality of layers within respective liquid crystal layers 1a, 1b, 1c. In this case, each liquid crystal layer is formed of two layers but may be formed of three layers.

Figure 10:
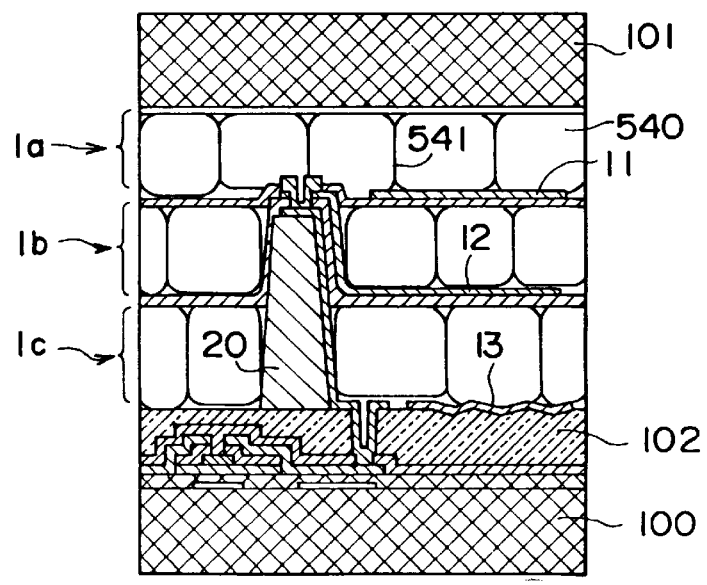

FIG. 10 shows that the liquid crystal microcapsules 540 are formed into a single layer in the respective liquid crystal layers 1a, 1b, 1c.

Figure 11:
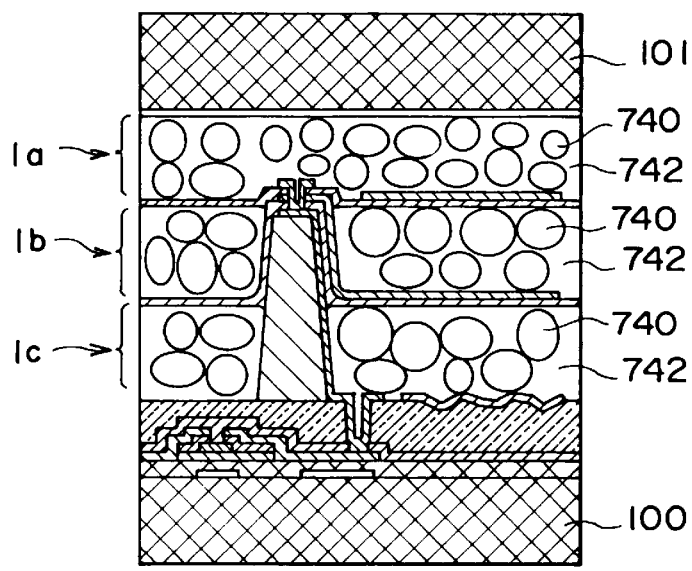

FIG. 11 shows that the liquid crystal layers have a polymer matrix 742, and liquid crystal microcapsules 740 are dispersed into the matrix 742. Additionally, protective films 35, 36 are also provided.

Figure 12:
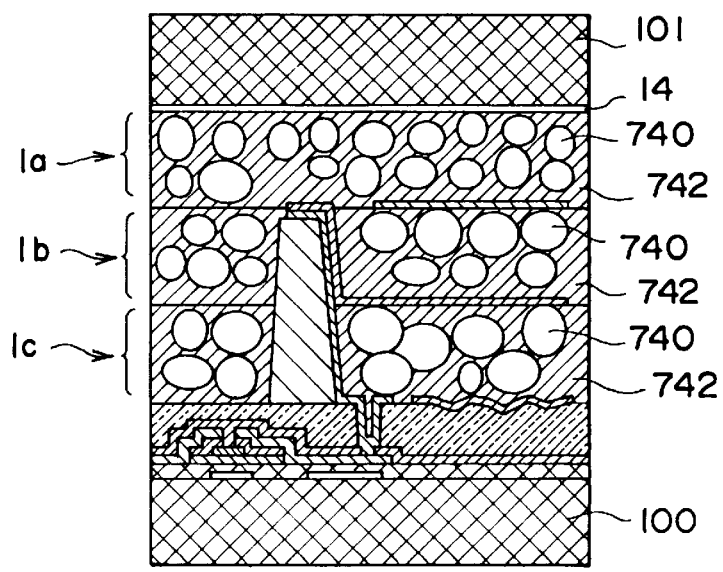

FIG. 12 shows that the liquid crystal layers have a polymer matrix 742, and liquid crystal microcapsules 740 are dispersed into the matrix 742. In this case, the liquid crystal layers 1a, 1b, 1c are not separated by the protective layers 35, 36.

In the configuration shown in FIG. 9, the layer of liquid crystal microcapsules can be formed into a flat shape. Therefore, it has advantages that orientation of liquid crystal molecules can be controlled two-dimensionally and the optical properties of the liquid crystal layer can be improved. In addition, by configuring the liquid crystal layer with a varying light absorbing axis and reflecting axis for respective layers as described afterward, the optical properties and contrast ratio of the liquid crystal layer can be improved.

The configuration of FIG. 10 has characteristics that a drive voltage for the liquid crystal layers 1a, 1b, 1c can be decreased because the partitions of liquid crystal microcapsules are not parallel to the liquid crystal layers 1a, 1b, 1c.

By configuring as shown in FIG. 11, the liquid crystal microcapsules can be formed strong.

Since the configuration shown in FIG. 12 does not need the protective films 35, 36, the step of forming the protective films and the step of forming the through hole can be omitted. Thus, the cost can be reduced and the drive voltage can be decreased.

The matrix for holding the liquid crystal is preferably made of a material having a high dielectric constant to prevent the drive voltage for the liquid crystal layer from being lowered by the matrix. Therefore, it is preferable to use a dielectric material having a small residue polarization. For example, a material having a dielectric constant of about 3 or more is used suitably.

Since the liquid crystal microcapsules can be adjusted to have an appropriate size, the liquid crystal microcapsules can be prevented from adhering to the top face of the pillar 20 by making the pillar 20 having the top face smaller than an average diameter of the liquid crystal microcapsules. In addition, the material for the pillar 20 and the material for the liquid crystal microcapsules are selected to lower affinity, so that adhesion of the liquid crystal microcapsules to the top face of the pillar 20 can be decreased. The liquid crystal microcapsules adhered to the top face can be removed by a post-process for mechanical removing by cleaning.

The liquid crystal display device described above has the liquid crystal layers 1a, 1b, 1c formed using the liquid crystal microcapsules, but the liquid crystal layers are not limited to the above-described configurations. For example, the liquid crystal may be dispersed into a network-shaped polymer matrix. In such a case, it is necessary to seal the end faces of the liquid crystal layer to keep fluid tightness of the liquid crystal layer. Thus, the production process can be simplified further, and productivity and yield can be improved.

(Embodiment 5)

Figure 13A:
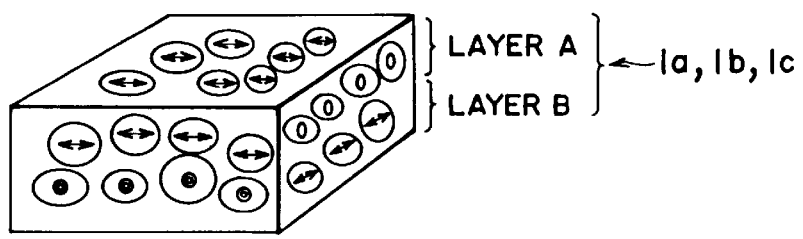
FIG. 13A, FIG. 13B, FIG. 13C and FIG. 13D are schematic diagrams showing respective liquid crystal layers consisting of a plurality of layers having a different orientation.
Figure 13B:
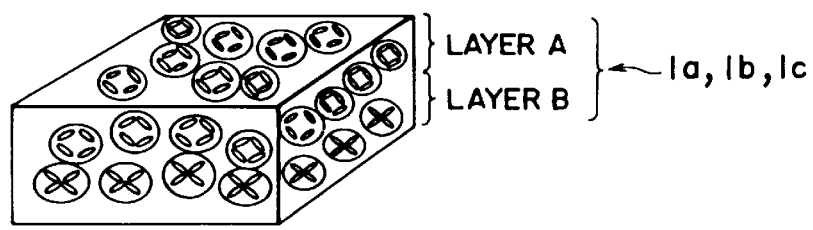
Figure 13C:
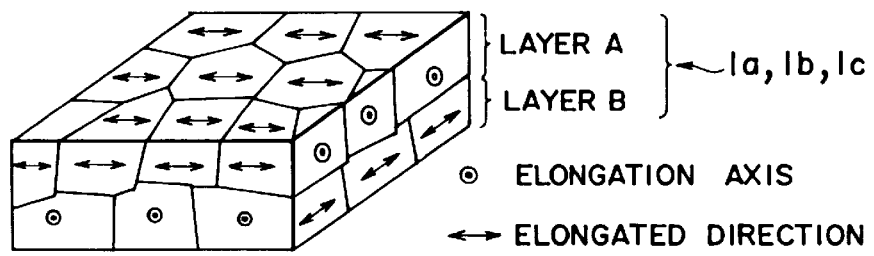
Figure 13D:
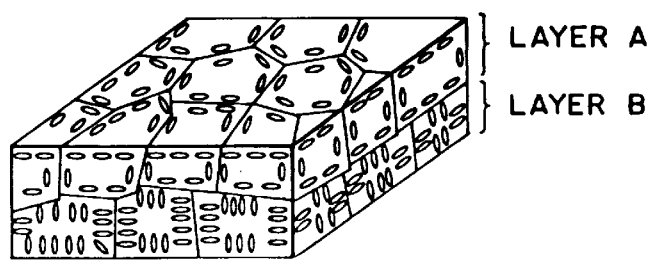

FIG. 13A, FIG. 13B, FIG. 13C and FIG. 13D are schematic diagrams showing that respective liquid crystal layers are formed of a plurality of layers having a different orientation. In this embodiment, each of the liquid crystal layers 1a, 1b, 1c is formed to have a two-layered structure consisting of layer A and layer B. FIG. 13A and FIG. 13B show that the liquid crystal layer is produced by dispersing liquid crystal microcapsules into a matrix, and FIG. 13C and FIG. 13D show that the liquid crystal layer is made of microcapsules having continuous partitions.

When a direction of orientation of liquid crystal molecules in the layer A is intersected at right angles with a direction of orientation of liquid crystal molecules in the layer B on the same plane (FIG. 13A, FIG. 13C), light can be absorbed in any directions covering 360 degrees.

FIG. 13B and FIG. 13D show that liquid crystal molecules in the layer A are oriented substantially parallel to the inner face of skin (partition) of the microcapsules, while liquid crystal molecules in the layer B are oriented substantially perpendicular to the inner face of skin of the microcapsules.

By configuring as described above, the incident light into the liquid crystal layer can be absorbed thoroughly, and the optical properties of the liquid crystal layer can be improved.

In addition, a liquid crystal, e.g., a cholesteric liquid crystal, reflecting or absorbing one circular polarization component of the circular polarizations may be sealed into the microcapsules. Additionally, the same effect can also be obtained by sealing a cholesteric liquid crystal having a clockwise (or anti-clockwise) spiral axis into the microcapsules of the layer A and a cholesteric liquid crystal having an anti-clockwise (or clockwise) spiral axis into the microcapsules of the layer B.

By configuring as described above, a high contrast ratio (about 10 to about 30) can be obtained with a small amount of pigment, absorption at transmission is decreased to make a white level bright, and a problem such as deposition of a pigment is relieved. Thus, a highly stable liquid crystal layer can be produced.

(Embodiment 6)

Figure 14:
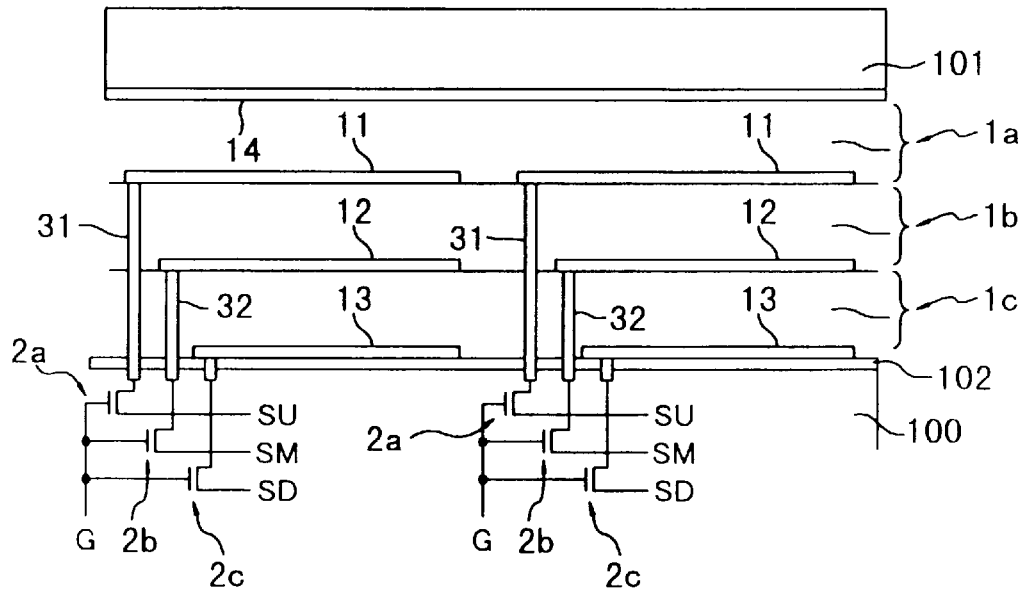
FIG. 14 is a schematic diagram showing the connected relations among an applying means for applying a display signal, a wiring pattern and a pixel electrode configuring the liquid crystal display device of the invention.
Figure 17:
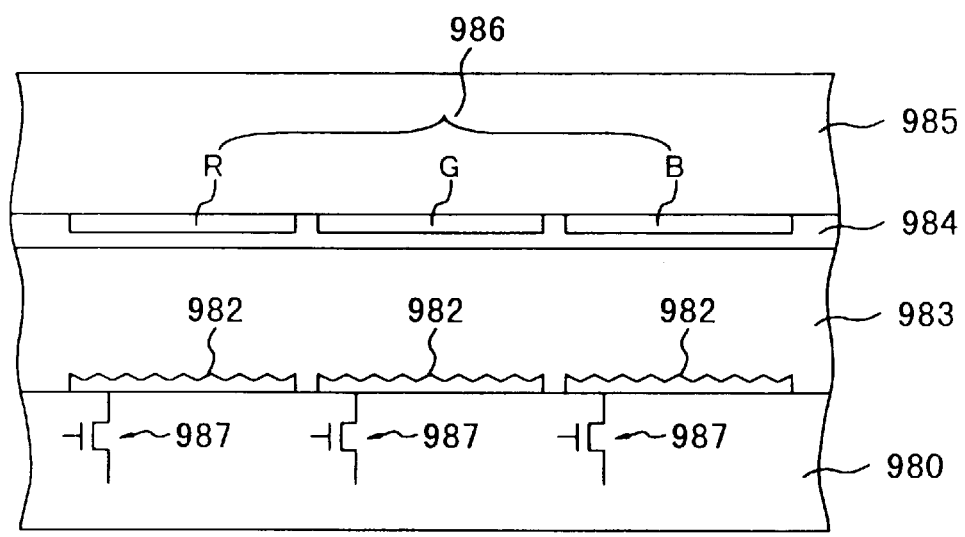
FIG. 17 is a schematic diagram showing the structure of a conventional liquid crystal display device; and, FIG. 18 is a schematic diagram showing another configuration of the liquid crystal display device of the invention.

FIG. 14 is a schematic diagram showing the connected relations among an applying means for applying a display signal, a wiring pattern and a pixel electrode configuring the liquid crystal display device of the invention.

This embodiment configures a three-layered liquid crystal layer with the subtractive three primary colors cyan, magenta and yellow. In any event, the laminated liquid crystal layers are not limited to the three layers, and four layers including a black color liquid crystal layer may be used. In addition, two liquid crystal layers may also be used.

Figure 16:
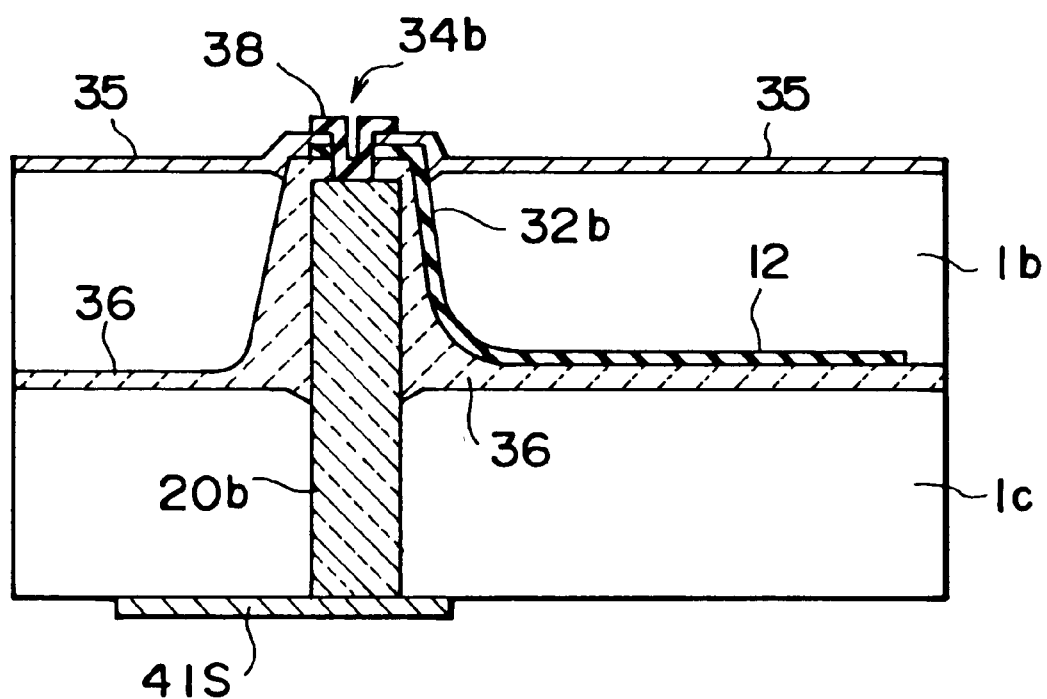
FIG. 16 is a schematic diagram showing another configuration of the liquid crystal display device of the invention.

Thus, the liquid crystal display device of the invention can make a monochrome display, a gray scale display, and a multicolor display. FIG. 16 shows that the gate electrodes of thin film transistors 2a, 2b, 2c are connected to a common gate line.

With the liquid crystal display device and the interconnector of the invention, when liquid crystal layers are laminated to form the liquid crystal display device, the connection between pixel electrodes formed on the liquid crystal layers and the nonlinear switching elements such as TFT for driving them is connected on the top face or lateral face of the pillar 20 which is formed to pierce through the liquid crystal layers. The pillar 20 may be formed one time regardless of a total number of liquid crystal layers to be laminated or a total number of conductive layers such as pixel electrodes. Therefore, the interconnection can be configured simple, and an interconnecting step can be omitted. Additionally, productivity of the liquid crystal display device can be improved, and its production cost can be decreased. Especially, the invention can be applied to a reflection type liquid crystal display device which has a plurality of laminated liquid crystal layers. Therefore, a liquid crystal display device having a low power consumption and a high display quality can be produced with high productivity.

(Embodiment 7)

Figure 15A:
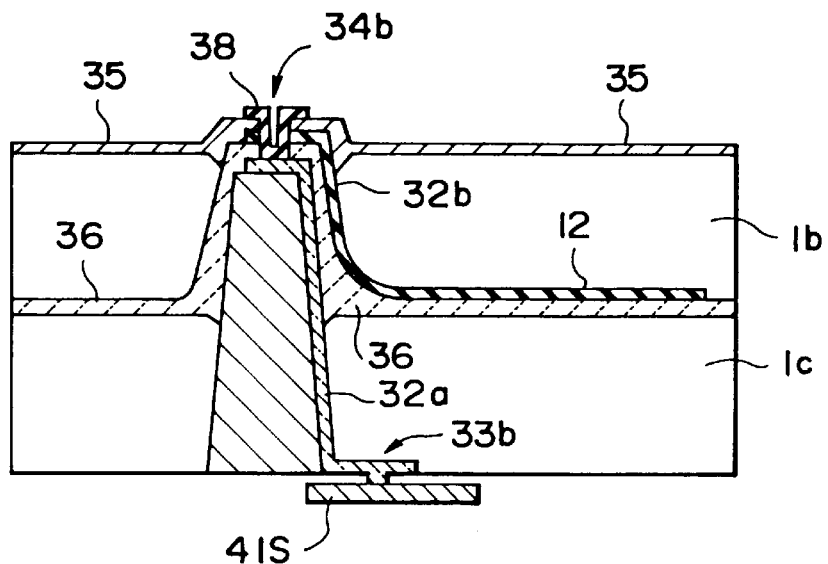
FIG. 15A and FIG. 15B are schematic diagrams showing other configurations of the liquid crystal display device of the invention.

FIG. 15A is a schematic diagram showing another configuration of the liquid crystal display device of the invention. This figure shows a sectional view taken on line A—A of FIG. 6A.

In this embodiment, a connecting portion from a wiring pattern 32b to a pixel electrode 12 is formed into a curved shape.

This shape, on which a stress is hardly concentrated, can be formed by controlling wettability and surface tension when a protective film 36 is formed. Thus, by forming the pillar 20 and the liquid crystal layer 1a to have round corners and a large thickness, the wiring pattern extended to the pixel electrode 12 can be prevented from being broken.

Especially, the liquid crystal layer essentially consists of a liquid, and its thermal expansion coefficient is large by one digit or more as compared with a solid organic resin. Therefore, when the center of the liquid crystal layer swells due to thermal expansion or the like, its force is applied to raise the corners where the liquid crystal layer is contacted with the pillar. This concentration of stress can be relieved and the reliability of interconnection can be improved by forming the protective film 36 with a large thickness and rounded corners as shown in the figure.

Figure 15B:
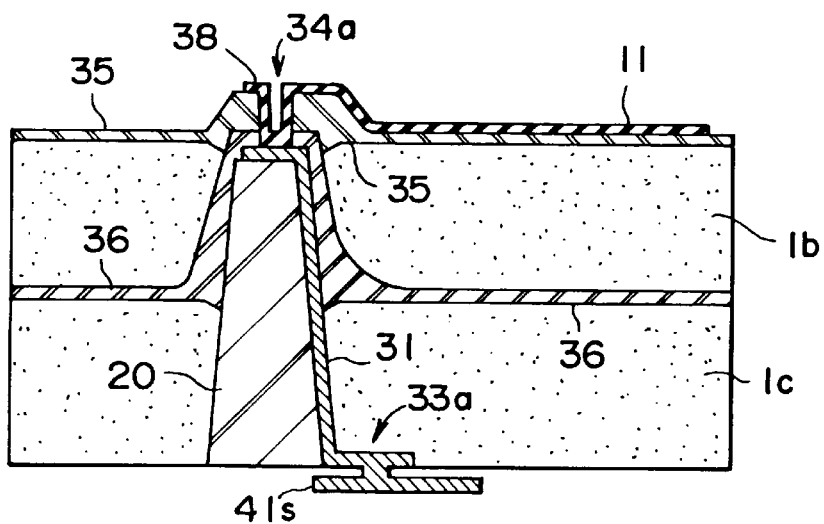

FIG. 15B is a schematic diagram showing another configuration of the liquid crystal display device of the invention. In this liquid crystal display device, a protective film 35 is formed thick and round in the same manner as the protective film 36 so that a stress is not concentrated on the connecting portion between a wiring pattern 31 and a first electrode 11. By configuring in this way, highly reliable connection can be made between the top face of the pillar 20 and the first electrode 11 even if there is a difference in level.

In this case, the connecting portion between a wiring pattern 32b and a pixel electrode 12 is formed to have a curved shape.

It is to be understood that the liquid crystal display device of this case also has the same effects as the one in the above-described embodiments. The protective film was formed to have the round corners, but the same effects can also be obtained by adopting another method or material (such as the liquid crystal layer itself).

(Embodiment 8)

FIG. 16 is a schematic diagram showing another configuration of the liquid crystal display device of the invention.

In this liquid crystal display device, the inter-connector is not a pillar made of an insulating material but a pillar made of a conductive material. In addition, this pillar may be made of, for example, a plated column or a conductive resin. Since the pillar itself is conductive, it may be formed to have a perpendicular lateral face.

In this embodiment, the plated column is made of Ni or Cu by electroplating as a pillar 20b. The pillar 20b is connected to a wiring pattern 32b through a through hole 34b and a connecting electrode 38 in the same way as in Embodiment 2.

Since the plated column 20b is not required to be formed every time each liquid crystal layer of the multilayered layer is formed, such steps can be decreased. In addition, formation of the plated column after forming liquid crystal layers 1c, 1b has a disadvantage that the lower liquid crystal layer 1c is damaged by a chemical such as acid in a process of patterning a pixel electrode 12. But, configuring as shown in FIG. 16 can prevent this disadvantage. Thus, a high-definition liquid crystal display device can be provided at high productivity and yield. In addition, this liquid crystal display device can also have the same effects as in the above-described respective embodiments.

(Embodiment 9)

Figure 18:
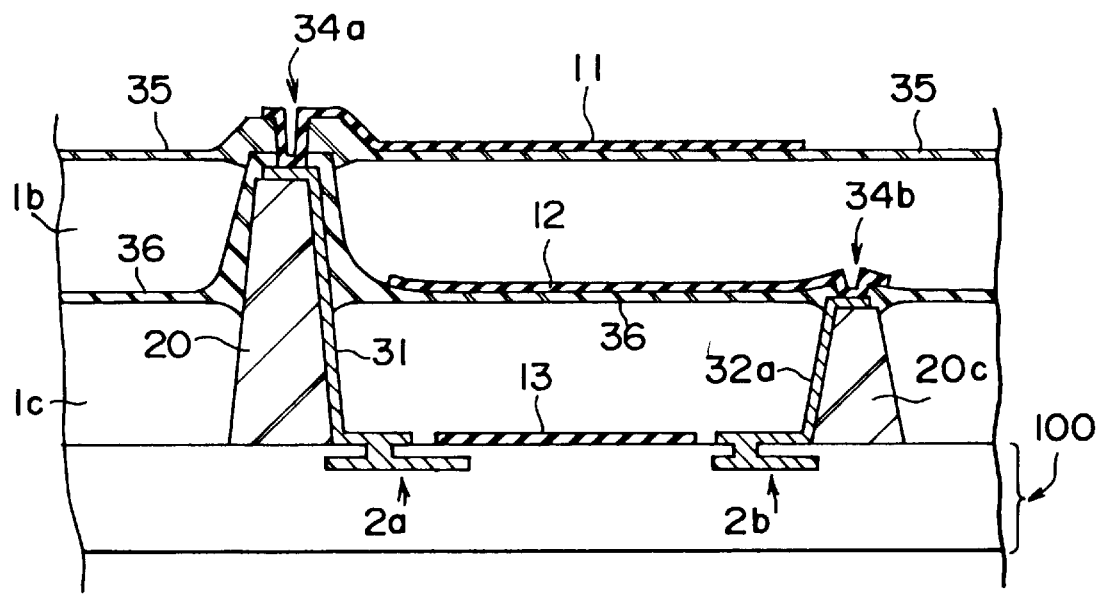

FIG. 18 is a schematic diagram showing another configuration of the liquid crystal display device of the invention.

In the above-described embodiment, a single pillar was used for the interconnection with a plurality of pixel electrodes configuring a unit picture element. Additionally, a plurality of pillars may also be used for the interconnection with a plurality of pixel electrodes configuring a picture element.

The liquid crystal display device shown in FIG. 18 has two pillars 20, 20c on a unit picture element. A first applying means, a thin film transistor 2a, is connected with a first pixel electrode 11 by means of the first pillar 20 and a first wiring pattern 31. Also, a second applying means, a thin film transistor 2b, is connected with a second pixel electrode 12 by means of the second pillar 20c and a second wiring pattern 32a.

Accordingly, the liquid crystal display device of the invention may use a plurality of pillars for the interconnection with a plurality of pixel electrodes configuring a unit picture element.

This embodiment has a different height between the first pillar 20 and the second pillar 20c. However, the second pillar 20c may be formed in the same height as the first pillar 20, so that the interconnection between the thin film transistor 2b and the pixel electrode 12 can be made as shown in FIG. 6B.

The liquid crystal display device and the inter-connector of the invention described in the embodiments can be adopted by modifying in various ways without departing from the spirit and scope of the invention. For example, the invention can be applied to the interconnection of a multi-layered wiring substrate or a semiconductor element.

According to the invention, the interconnection can be made by a simple structure, and steps for interconnecting can be decreased. Therefore, productivity of the liquid crystal display device can be improved, and its cost can be decreased. By applying the invention to a reflection type liquid crystal display device having a plurality of laminated liquid crystal layers, a high-definition liquid crystal display device with a low power consumption can be produced at high productivity.

What is claimed is:

1. A liquid crystal display device comprising:

a first substrate having a first applying means for applying a first signal and a second applying means for applying a second signal;

a first electrode opposed to the first substrate;

a second electrode interposed between the first substrate and the first electrode, the second electrode being overlapped with the first electrode;

a first liquid crystal layer interposed between the first electrode and the second electrode;

a second liquid crystal layer interposed between the second electrode and the first substrate;

a pillar formed on the first substrate so as to pierce through the first and the second liquid crystal layers, the pillar being formed of an insulating material, and the pillar having a top face and a lateral face; and a first and a second wiring patterns formed around a lateral face of the pillar, the first wiring pattern connecting the first applying means to the first electrode, and the second wiring pattern connecting the second applying means to the second electrode;

wherein the first liquid crystal layer comprises microcapsules containing a first liquid crystal material, wherein the second liquid crystal layer comprises microcapsules containing a second liquid crystal material, wherein the first wiring pattern is formed extendingly to the top face of the pillar, and the first wiring pattern is connected with the first electrode on the top face of the pillar, and wherein the second wiring pattern has a first portion and a second portion, the first portion is formed from the second applying means to the top face of the pillar, the second portion is formed from the top face of the pillar to the second electrode, and the first portion and the second portion of the second wiring pattern are connected at the top face of the pillar.

2. The liquid crystal display device as set forth in claim 1, wherein the pillar having a truncated pyramid shape.

3. The liquid crystal display device as set forth in claim 1, wherein the first wiring pattern and the first electrode are laminated on the top face of the pillar with intervening an insulating film having a through hole, and the first wiring pattern and the first electrode layer are connected through the through hole.

4. The liquid crystal display device as set forth in claim 1, wherein the second portion is laminated on the first portion.

5. The liquid crystal display device as set forth in claim 1, wherein a connecting portion of the second wiring pattern and the second electrode is formed so as to release a stress.

6. The liquid crystal display device as set forth in claim 5, wherein the connecting portion of the second wiring pattern having a curved profile.

7. The liquid crystal display device as set forth in claim 1, wherein the first substrate has a third applying means for applying a third signal, the device further comprising a third electrode formed on the first substrate with an intervening insulating layer, the third electrode being overlapped with the first and the second electrode, and the third electrode being connected with the third applying means through the insulating layer.

8. The liquid crystal display device as set forth in claim 7, further comprising:

a second substrate having a fourth electrode;

a third liquid crystal layer interposed between the first electrode and the fourth electrode; and a fourth applying means for applying a fourth signal to the fourth electrode.

9. The liquid crystal display device as set forth in claim 7, wherein a reflection or an absorption of a light of respective liquid crystal layers are different from each other.

10. The liquid crystal display device as set forth in claim 1, wherein the liquid crystal display device has a plurality of the first electrodes and the pillar is formed having an elongated shape so as to support a plurality of the first electrodes.

11. The liquid crystal display device as set forth in claim 1,
wherein the first liquid crystal layer consisting of a first sub-layer and a second sub-layer,
wherein the second liquid crystal layer consisting of a third sub-layer and a fourth sub-layer,
wherein the first sub-layer has a first light axis of absorption or light axis of reflection, the second sub-layer has a second light axis of absorption or light axis of reflection, and the first light axis and the second light axis are different from each other, and
wherein the third sub-layer has a third light axis of absorption or light axis of reflection, the fourth sub-layer has a fourth light axis of absorption or light axis of reflection and the third light axis and the fourth light axis are different from each other.

12. The liquid crystal display device as set forth in claim 11,
wherein the liquid crystal molecules of the first sub-layer are oriented in a first direction, and the liquid crystal molecules of the second sub-layer are oriented in a second direction which is different from the first direction, and
wherein the liquid crystal molecules of the third sub-layer are oriented in a third direction, and the liquid crystal molecules of the fourth sub-layer are oriented in a fourth direction which is different from the third direction.

13. The liquid crystal display device as set forth in claim 12,
wherein the first direction is substantially perpendicular to the second direction, and the first and the second directions are substantially perpendicular to a normal direction of the first liquid crystal layer, and
wherein the third direction is substantially perpendicular to the fourth direction, and the third and the fourth directions are substantially perpendicular to a normal direction of the second liquid crystal layer.

14. The liquid crystal display device as set forth in claim 12,
wherein the first sub-layer has means for orienting the liquid crystal molecules of the first sub-layer in the first direction, and the second sub-layer has means for orienting the liquid crystal molecules of the second sub-layer in the second direction, and
wherein the third sub-layer has means for orienting the liquid crystal molecules of the third sub-layer in the third direction, and the fourth sub-layer has means for orienting the liquid crystal molecules of the fourth sub, layer in the fourth direction.

15. The liquid crystal display as set forth in claim 1, wherein the liquid crystal display is manufactured by the following steps:
forming the first and the second applying means on the first substrate;
forming the pillar on the first substrate;
forming the first wiring pattern and the first portion of the second wiring pattern on the pillar;
electrically connecting the first applying means to the second wiring pattern, and the second applying means to the second wiring pattern; forming the second liquid crystal layer on the first substrate;
forming the second portion of the second wiring pattern on the pillar, and the second electrode on the second liquid crystal layer;
forming the first liquid crystal layer on the second electrode;
forming the first electrode on the first liquid crystal layer; and
electrically connecting the first electrode to the first wiring pattern, and the first portion to the second portion.

16. The liquid crystal display as set forth in claim 1, wherein the pillar is single in a unit picture element.

17. A liquid crystal display device, comprising:
a first substrate having a first applying means for applying a first signal and a second applying means for applying a second signal;
a first electrode opposed to the first substrate
a second electrode interposed between the first substrate and the first electrode, the second electrode being overlapped with the first electrode;
a first liquid crystal layer interposed between the first electrode and the second electrode;
a second liquid crystal layer interposed between the second electrode and the first substrate;
at least a wall having a top face and a lateral face, the wall formed on the first substrate so as to pierce through the first and the second liquid crystal layers, and the wall being formed of an insulating material; and
a first and a second wiring patterns formed around a lateral face of the wall, the first wiring pattern connecting the first applying means and the first electrode, and the second wiring pattern connecting the second applying means and the second electrode,
wherein the first liquid crystal layer comprises microcapsules containing a first liquid crystal material,
wherein the second liquid crystal layer comprises microcapsules containing a second liquid crystal material,
wherein the first wiring pattern is formed extendingly to a top face of the wall, the first wiring pattern being connected with the first electrode on the top face of the wall, and
wherein the second wiring pattern has a first portion and a second portion, the first portion being formed from the second applying means to the top face of the wall, the second portion being formed from the top face of the wall to the second electrode, and the first portion and the second portion of the second wiring pattern being connected at the top face of the wall.

18. The liquid crystal display device as set forth in claim 17, further comprising a plurality of said first electrodes arranged in a matrix array, and the wall is elongated with a column or a row of the first electrodes.

19. The liquid crystal display device as set forth in claim 17, further comprising a plurality of said first electrodes arranged in a matrix array, and the wall surrounds respective first electrodes.

20. An inter-connector connecting a first conductive layer and a second conductive layer interposing an insulating layer having a first and a second insulating layer, comprising:

a pillar piercing through the insulating layer, the pillar being formed of an insulating material, and the pillar having a top face and a lateral face;

a first wiring pattern formed on the lateral face of the pillar, the wiring pattern connecting the first conductive layer and the second conductive layer; and a second wiring pattern formed around the lateral face of the pillar, the second wiring pattern connecting the first conductive layer and a third conductive layer, and the third conductive layer interposed between the first insulating layer and the second insulating layer, wherein the first insulating layer is a liquid having microcapsules containing a first liquid crystal, wherein the second insulating layer is a liquid crystal layer having microcapsules containing a second liquid crystal, wherein the first wiring pattern is formed extendingly to a top face of the pillar, and the first wiring pattern is connected with the first conductive layer on the top face of the pillar, wherein the second wiring pattern has a first portion and a second portion, the first portion is formed from the first conductive layer to the top face of the pillar the second portion is formed from the top face of the pillar to the third conductive layer and the first portion and the second portion of the second wiring pattern are connected at the top face of the pillar.

21. The inter-connector as set forth in claim 20, wherein the pillar has a truncated pyramid shape, and the top face of the pillar is opposed to the first conductive layer.

22. The inter-connector as set forth in claim 20 wherein the first wiring pattern and the first conductive layer are laminated on the top face of the pillar with intervening an insulating film having a through hole, and the first wiring pattern and the first conductive layer are connected through the through hole.

23. The inter-connector as set forth in claim 20, wherein a connecting portion of the second wiring pattern and the third conductive layer is formed so as to release a stress.

24. The inter-connector as set forth in claim 23, wherein the connecting portion of the second wiring pattern has a curved profile.

25. A liquid crystal display device, comprising:

a first substrate having a first applying means for applying a first signal and a second applying means for applying a second signal;

a first electrode opposed to the first substrate;

a second electrode interposed between the first substrate and the first electrode, the second electrode being overlapped with the first electrode;

a first liquid crystal layer interposed between the first electrode and the second electrode;

a second liquid crystal layer interposed between the second electrode and the first substrate;

a pillar formed on the first substrate so as to pierce through the first and the second liquid crystal layer, the pillar being formed of an insulating material, and the pillar having a top face and a lateral face; and first and second wiring patterns formed around a lateral face of the pillar, the first wiring pattern connecting the first applying means to the first electrode, and the second wiring pattern connecting the second applying means to the second electrode;

wherein the first liquid crystal layer comprises a polymer matrix and a liquid crystal material dispersed in the polymer matrix, wherein the second liquid crystal layer comprises a polymer matrix and a liquid crystal material dispersed in the polymer matrix, wherein the first wiring pattern is formed extendingly to a top face of the pillar, and the first wiring pattern is connected with the first electrode on the top face of the pillar, and wherein the second wiring pattern has a first portion and a second portion, the first portion is formed from the second applying means to the top face of the pillar, the second portion is formed from the top face of the pillar to the second electrode, and the first portion and the second portion of the second wiring pattern are connected at the top face of the pillar.

* * * * *

UNITED STATES PATENT AND TRADEMARK OFFICE
CERTIFICATE OF CORRECTION

PATENT NO.: 6,067,134

DATED: May 23, 2000

INVENTOR(S): Akiyama et al.

It is certified that an error appears in the above-identified patent and that said Letters Patent is hereby corrected as shown below:

Claim 2, column 22, line 40, change "having" to --has--.

Claim 3, column 22, line 43, change "intervening an" to --an intervening--.

Claim 6, column 22, line 54, change "having" to --has--.

Claim 17, column 24, line 24, change "substrate" to --substrate;--.

Claim 22, column 25, line 34, change "intervening an" to --an intervening--.

Signed and Sealed this

Twenty-second Day of May, 2001

*Attest:*

NICHOLAS P. GODICI

*Attesting Officer*  *Acting Director of the United States Patent and Trademark Office*